US008654850B2

(12) United States Patent
Shimizu et al.

(10) Patent No.: US 8,654,850 B2
(45) Date of Patent: Feb. 18, 2014

(54) IMAGE CODING DEVICE AND IMAGE CODING METHOD

(75) Inventors: Kenji Shimizu, Fukuoka (JP); Ryuji Fuchikami, Fukuoka (JP)

(73) Assignee: Panasonic Corporation, Osaka (JP)

( * ) Notice: Subject to any disclaimer, the term of this patent is extended or adjusted under 35 U.S.C. 154(b) by 859 days.

(21) Appl. No.: 12/669,630

(22) PCT Filed: May 19, 2009

(86) PCT No.: PCT/JP2009/002207
§ 371 (c)(1),
(2), (4) Date: Jan. 19, 2010

(87) PCT Pub. No.: WO2009/142003
PCT Pub. Date: Nov. 26, 2009

(65) Prior Publication Data
US 2010/0296582 A1 Nov. 25, 2010

(30) Foreign Application Priority Data
May 20, 2008 (JP) ................................. 2008-131508

(51) Int. Cl.
*H04N 7/32* (2006.01)
(52) U.S. Cl.
USPC ............... 375/240.16; 375/240.17; 375/240.1
(58) Field of Classification Search
USPC ............................ 375/240.16, 240.17, 240.1
See application file for complete search history.

(56) References Cited

U.S. PATENT DOCUMENTS

| 5,351,083 A * | 9/1994 | Tsukagoshi ................ 348/384.1 |
| 6,418,168 B1 | 7/2002 | Narita |
| 2006/0203908 A1* | 9/2006 | Chuang ..................... 375/240.12 |
| 2007/0098075 A1* | 5/2007 | Ohgose et al. .......... 375/240.16 |

FOREIGN PATENT DOCUMENTS

| JP | 5-183891 | 7/1993 |
| JP | 6-303590 | 10/1994 |
| JP | 9-18878 | 1/1997 |
| JP | 10-178643 | 6/1998 |
| JP | 10-327416 | 12/1998 |
| JP | 11-275586 | 10/1999 |
| JP | 2000-278688 | 10/2000 |

OTHER PUBLICATIONS

International Search Report issued Aug. 25, 2009 in International (PCT) Application No. PCT/2009/002207.

* cited by examiner

*Primary Examiner* — Christopher S Kelley
*Assistant Examiner* — Maria Vazquez Colon
(74) *Attorney, Agent, or Firm* — Wenderoth, Lind & Ponack, L.L.P.

(57) ABSTRACT

An image coding device (300) according to the present invention includes: a signal division unit (302) which divides each of pictures included in an input image signal (310) into a first coding target region (315A) and a second coding target region (315B); a first coding unit (303A) which codes the first coding target region (315A) to generate a first coded signal (313A); a second coding unit (303B) which codes the second coding target region (315B) to generate a second coded signal (313B); and a signal combining unit (307) which combines the first coded signal (313A) and the second coded signal (313B) to generate an output coded signal (314), wherein the signal division unit (302) determines, as a range to be used for motion vector search by the first coding unit (303A), a range including the first coding target region (315A) and a first overlap region (316A), and changes a size of the first overlap region (316A) according to a predetermined condition.

16 Claims, 23 Drawing Sheets

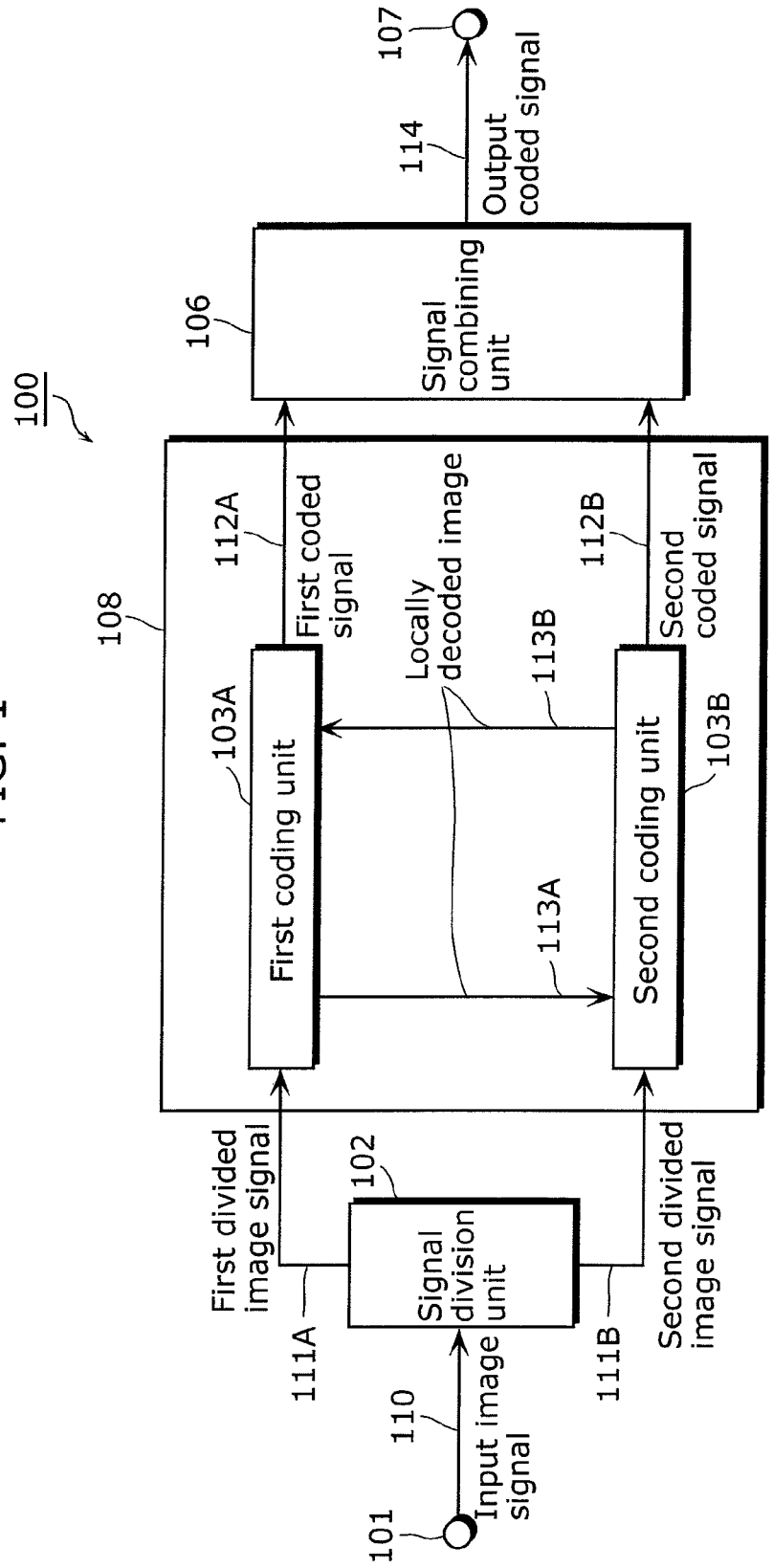

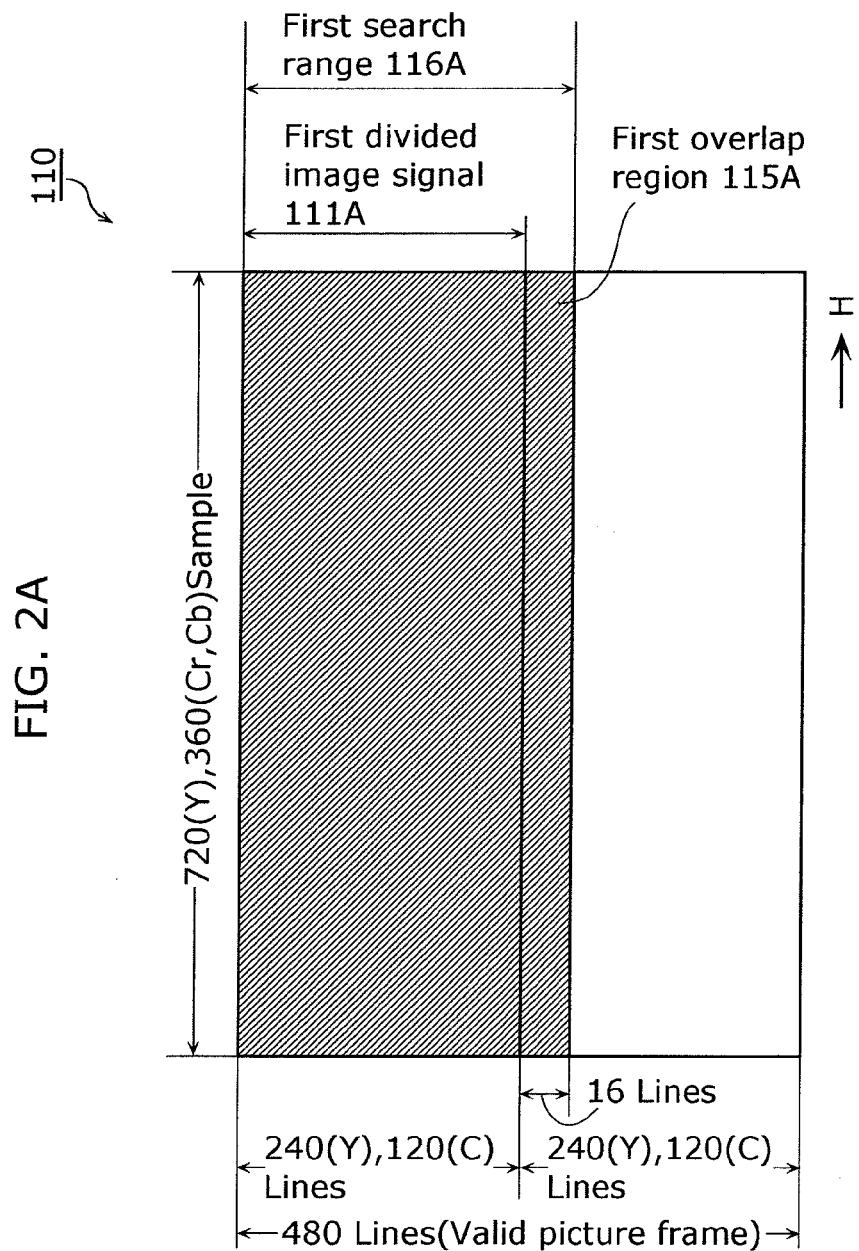

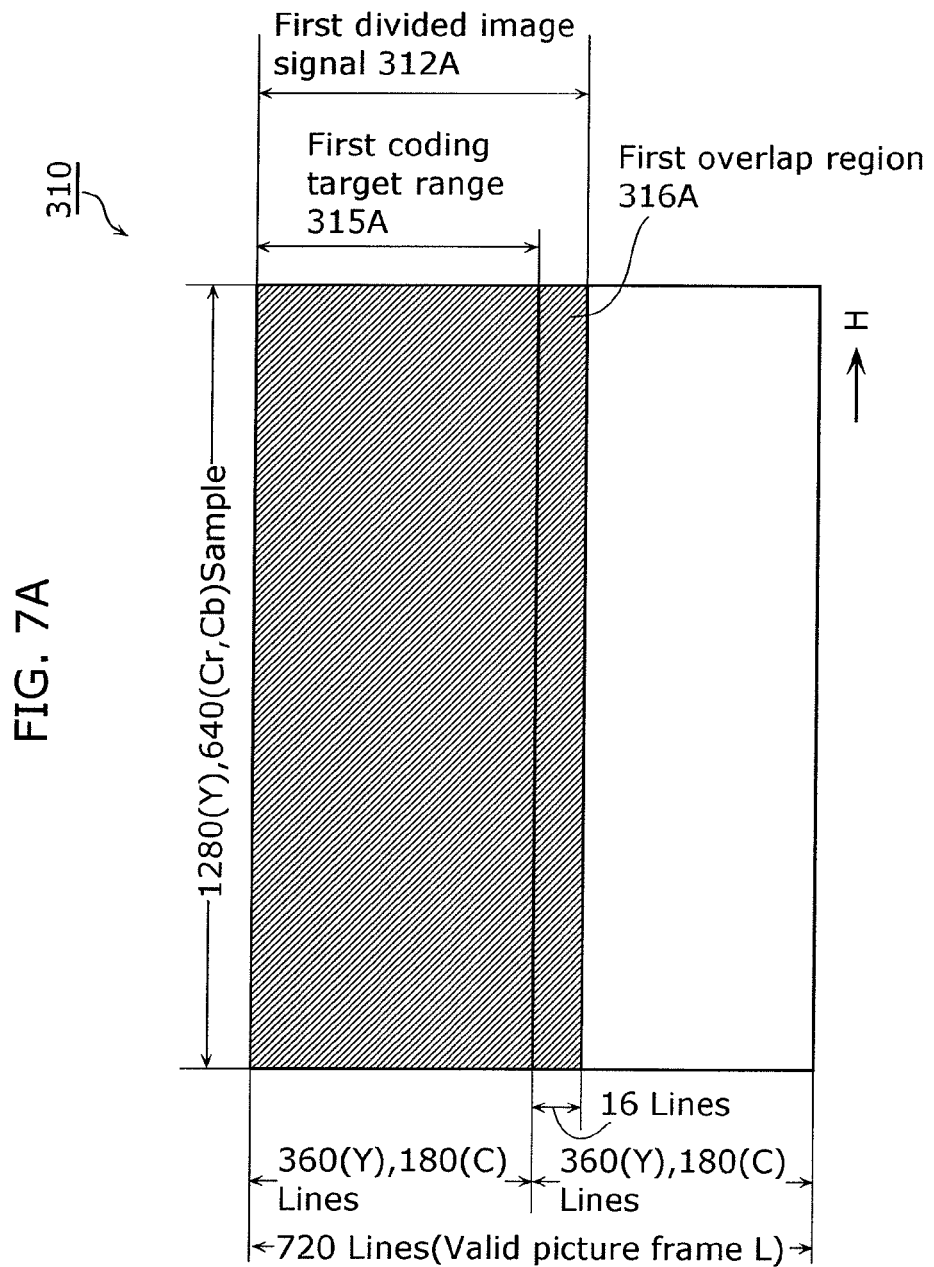

IMAGE CODING DEVICE AND IMAGE CODING METHOD

TECHNICAL FIELD

The present invention relates to image coding devices and image coding methods, and in particular to an image coding device which divides each of pictures into plural images and codes, using plural coding units, the plural images obtained by the division.

BACKGROUND ART

A conventionally known technique for coding video signals of a high pixel rate, such as HDTV (high-definition television) images, is to divide each of the HDTV images into plural regions and to code, using a coding unit (compression-encoder) of a low pixel rate, each of image signals obtained by the division, so that the processing speed is reduced. With this technique, an image coding device which can handle high pixel rates can be provided (refer to Patent Literature 1, for example). FIG. 1 is a block diagram showing the structure of a conventional image coding device 100 of Patent Literature 1.

The image coding device 100 shown in FIG. 1 includes an image signal input terminal 101, a signal division unit 102, a coding unit 108, a signal combining unit 106, and a coded signal output terminal 107. The coding unit 108 includes a first coding unit 103A and a second coding unit 103B.

The image signal input terminal 101 is supplied with an input image signal (video signal) 110 of a high pixel rate. The input image signal 110 of a high pixel rate is, for example, one of sequential signals such as the high-definition signals mentioned above.

The signal division unit 102 generates a first divided image signal 111A and a second divided image signal 111B by horizontally dividing the input image signal 110 into two, for example. For example, when the valid picture frame of the input image signal 110 has 480 lines, each of the first divided image signal 111A and the second divided image signal 111B is an image signal having 240 lines.

The first coding unit 103A and the second coding unit 103B are encoders handling low pixel rates. The first coding unit 103A generates a first coded signal 112A by compression-coding the first divided image signal 111A. The second coding unit 103B generates a second coded signal 112B by compression-coding the second divided image signal 111B.

Further, when performing motion estimation and motion compensation on an image near the boundary between the first divided image signal 111A and the second divided image signal 111B, the first coding unit 103A uses a locally decoded image which corresponds to a first overlap region 115A and is generated by the second coding unit 103B, whereas the second coding unit 103B uses a locally decoded image which corresponds to a second overlap region 115B and is generated by the first coding unit 103A.

FIG. 2A shows the first divided image signal 111A and the first overlap region 115A. FIG. 2B shows the second divided image signal 111B and the second overlap region 115B.

The first coding unit 103A generates a locally decoded image of the first divided image signal 111A when coding the first divided image signal 111A. In addition, out of the locally decoded image generated, the first coding unit 103A outputs, to the second coding unit 103B, a locally decoded image 113A corresponding to the second overlap region 115B included in a second search range 116B of the second coding unit 103B.

Similarly, the second coding unit 103B generates a locally decoded image of the second divided image signal 111B when coding the second divided image signal 111B. In addition, out of the locally decoded image generated, the second unit 103B outputs, to the first coding unit 103A, a locally decoded image 113B corresponding to the first overlap region 115A included in a first search range 116A of the first coding unit 103A.

Furthermore, the first coding unit 103A uses a locally decoded image corresponding to the first search range 116A when performing the motion estimation and the motion compensation on the first divided image signal 111A. The first coding unit 103A uses the locally decoded image 113B outputted by the second coding unit 103B, as the locally decoded image corresponding to the first overlap region 115A included in the first search range 116A.

Furthermore, the second coding unit 103B uses a locally decoded image corresponding to the second search range 116B when performing the motion estimation and the motion compensation on the second divided image signal 111B. The second coding unit 103B uses the locally decoded image 113A outputted by the first coding unit 103A, as the locally decoded image corresponding to the second overlap region 115B included in the second search range 116B.

The signal combining unit 106 generates an output coded signal 114 of a high pixel rate by combining the first coded signal 112A and the second coded signal 112B converted into signals of a low pixel rate. Then, the signal combining unit 106 outputs the output coded signal 114 to the coded signal output terminal 107. In this manner, the image coding device 100 of Patent Literature 1 provides the image coding device handling high pixel rates by using the first coding unit 103A and the second coding unit 103B which handle low pixel rates.

CITATION LIST

Patent Literature

[Patent Literature 1]
Japanese Unexamined Patent Application Publication No. 10-178643

SUMMARY OF INVENTION

Technical Problem

With the image coding device 100 of Patent Literature 1, however, the first coding unit 103A and the second coding unit 103B adjacent to each other need to share the locally decoded images 113A and 113B because the first coding unit 103A refers to the locally decoded image 113B and the second coding unit 103B refers to the locally decoded image 113A. For this reason, the image coding apparatus 100 of Patent Literature 1 has a problem that an increase in the pixel rate of the input image signal 110 causes an increase in the amount of data in the locally decoded images 113A and 113B transferred, resulting in a wider bandwidth.

Further, when implementing the first coding unit 103A and the second coding unit 103B using separate integrated circuits, transfer via an external bus that connects the integrated circuits is very slow compared to the internal coding processing, thereby making the transfer via the external bus slow. As a result, the conventional image coding device 100 has a problem of a bottleneck in the speed of the coding processing caused by increased latency in the data transfer of the locally decoded images 113A and 113B.

The present invention is to solve the above conventional problems, and an object of the present invention is to provide an image coding device and an image coding method for reducing the amount of data in the locally decoded images transferred between the adjacent coding units.

Solution to Problem

In order to achieve the above object, the image coding device according to the present invention is an image coding device which codes an input image signal to generate an output coded signal, the image coding device including: a signal division unit configured to divide each of pictures included in the input image signal into plural images to be coded; plural coding units each of which corresponds to one of the plural images to be coded and is configured to code the corresponding one of the plural images to be coded to generate a coded signal, and to code and decode the corresponding one of the plural images to be coded to generate a locally decoded image, the coding including motion compensation; and a signal combining unit configured to combine plural coded signals generated by the plural coding units to generate the output coded signal, wherein the signal division unit is configured to determine, as a search range to be used for the motion compensation by each of the plural coding units, a range including (i) one of the plural images to be coded corresponding to the coding unit and (ii) an overlap region which is adjacent to the one of the plural images to be coded and is included in another one of the plural images to be coded that is adjacent to the one of the plural images to be coded, each of the plural coding units is configured to perform the motion compensation using a first locally decoded image of the corresponding one of the plural images to be coded and a second locally decoded image of the overlap region, the first locally decoded image being generated by the coding unit, the second locally decoded image being generated by another one of the plural coding units, and the corresponding one of the plural images to be coded and the overlap region being included in the search range, and the signal division unit is configured to change a size of the overlap region according to a predetermined condition.

This structure allows the image coding device according to the present invention to reduce the amount of data in the locally decoded image transferred between the adjacent coding units, by diminishing the overlap region when the amount of data transferred between the coding units increases, for example. This leads to decrease in the communication bandwidth between the coding units. Further, the decrease in the communication bandwidth between the coding units allows the image coding device according to the present invention to process an input image signal of a higher pixel rate.

Further, the signal division unit may be configured to determine, as the size of the overlap region, a first size when a pixel rate is lower than a first threshold, and a second size, which is smaller than the first size, when the pixel rate is higher than the first threshold, the pixel rate being the number of pixels to be processed by the image coding device per unit of time.

This structure allows the image coding device according to the present invention to reduce the amount of data in the second locally decoded image transferred between the coding units when the pixel rate is high. This leads to decrease in the communication bandwidth between the coding units. Further, the decrease in the communication bandwidth between the coding units allows the image coding device according to the present invention to process an input image signal of a higher pixel rate.

In addition, when the pixel rate is high; that is, for example, when the frame rate is higher than 30 or 60 frames per second (300 frames per second, for example), the time interval between pictures is small, making the motion of the object captured or the motion of the imaging unit small. Thus, the coding efficiency and the image quality are not likely to deteriorate even when the search range of the motion compensation is diminished. In such a manner, the image coding device according to the present invention can handle a higher pixel rate while suppressing the deterioration of the coding efficiency and the image quality.

Furthermore, each of the plural coding units may include: a motion estimation unit configured to estimate a motion vector for each of plural blocks included in the corresponding one of the plural images to be coded; and a motion compensation unit configured to perform the motion compensation using the motion vector estimated by the motion estimation unit, and the image coding device may further include plural original image storing units each of which corresponds to one of the plural coding units and is configured to store, as an original image, the corresponding one of the plural images to be coded and an image of the overlap region corresponding to the corresponding one of the plural images to be coded, wherein the motion estimation unit may be configured to estimate the motion vector using the original image stored in a corresponding one of the plural original image storing units.

This structure allows the image coding device according to the present invention to obtain the second locally decoded image while the motion estimation unit calculates the motion vector using the original image. As a result, the image coding device according to the present invention can reduce the latency, because it is possible to decrease the waiting time for which the motion estimation unit waits for the second locally decoded image. As a consequence, the image coding device according to the present invention can handle a higher pixel rate.

The image coding device may further include plural locally decoded image storing units each of which corresponds to one of the plural coding units and is configured to store the first locally decoded image and the second locally decoded image which are to be used by the corresponding one of the plural coding units for the motion compensation, and the motion estimation unit may be configured to estimate the motion vector using the original image stored in the corresponding one of the plural original image storing units when the pixel rate is higher than a second threshold, and estimate the motion vector using the first locally decoded image and the second locally decoded image stored in a corresponding one of the plural locally decoded image storing units when the pixel rate is lower than the second threshold.

This structure allows the image coding device according to the present invention to reduce the latency by, in the case of a high pixel rate, obtaining the second locally decoded image while calculating the motion vector using the original image. In addition, the image coding device according to the present invention can suppress image quality deterioration by calculating the motion vector using the locally decoded image in the case of a low pixel rate.

Further, each of the plural coding units may be configured to request the second locally decoded image from another one of the plural coding units, and when the pixel rate is higher than the second threshold, the motion estimation unit may be configured to start estimating the motion vector using the original image stored in the corresponding one of the plural original image storing units before the coding unit which has requested the second locally decoded image obtains the second locally decoded image from the another one of the plural coding units as a result of the request.

This structure allows the image coding device according to the present invention to obtain the second locally decoded image from another one of the plural coding units while the motion estimation unit calculates the motion vector using the original image. As a result, the image coding device according to the present invention can reduce the latency, because it is possible to decrease the waiting time for which the motion estimation unit waits for the second locally decoded image.

Furthermore, the image coding device may further include a pixel rate obtaining unit configured to obtain the pixel rate specified by a user operation.

Moreover, the image coding device may further include: a first calculation unit configured to calculate at least one of an image size of the input image signal and a frame rate of the input image signal, using information included in the input image signal; and a second calculation unit configured to calculate the pixel rate using at least one of the image size and the frame rate calculated by the first calculation unit.

This structure allows the image coding device according to the present invention to automatically determine the pixel rate of the input image signal and change the size of the overlap region according to the pixel rate determined.

Further, the first calculation unit may be configured to calculate at least one of the image size of the input image signal and the frame rate of the input image signal, using at least one of a pixel clock, a horizontal synchronization signal, and a vertical synchronization signal which are included in the input image signal.

In addition, the image coding device may further include a first storing unit configured to store the first locally decoded images each of which is generated by a corresponding one of the plural coding units, and the signal division unit may be configured to determine, as the size of the overlap region, a first size when an available capacity of the first storing unit is greater than a first threshold, and a second size, which is smaller than the first size, when the available capacity is smaller than the first threshold.

This structure allows reduction in the processing amounts of the plural coding units when the available resources of the coding units decrease and the processing statuses of the coding units are busy.

Further, the first storing unit may include plural second storing units each of which corresponds to one of the plural coding units and is configured to store a corresponding one of the first locally decoded images and a corresponding one of the second locally decoded images, the corresponding one of the first locally decoded images and the corresponding one of the second locally decoded images being used by the corresponding one of the plural coding units for the motion compensation, and the signal division unit may be configured to determine, as the size of the overlap region, the first size when a smallest one of available capacities of the plural second storing units is greater than the first threshold, and the second size when the smallest one of the available capacities is smaller than the first threshold.

This structure allows reduction in the processing amount of one of the plural coding units when the available resources of the one of the coding units decrease and the processing status of the one of the coding units is busy.

Furthermore, each of the plural coding units may include: a motion estimation unit configured to estimate a motion vector for each of plural blocks included in the corresponding one of the plural images to be coded; and a motion compensation unit configured to perform the motion compensation using the motion vector estimated by the motion estimation unit, and the signal division unit may be configured to determine, as the size of the overlap region, a first size when the motion vector is greater than a first threshold, and a second size, which is smaller than the first size, when the motion vector is smaller than the first threshold.

With this structure, the image coding device according to the present invention diminishes the overlap region when the motion vector is small. Here, when the motion vector is small, diminishing the search range is not likely to cause deterioration of the coding efficiency and the image quality. This way, the image coding device according to the present invention can perform the coding processing at a higher pixel rate while suppressing the deterioration of the coding efficiency and the image quality.

Moreover, the signal division unit may be configured to determine, as the size of the overlap region, the first size when a greatest motion vector is greater than the first threshold, and the second size when the greatest motion vector is smaller than the first threshold, the greatest motion vector being included in motion vectors extending across a boundary of the plural images to be coded, the motion vectors extending across the boundary being included in motion vectors estimated by the motion estimation unit.

With this structure, the image coding device according to the present invention changes the size of the overlap region according to the motion vector of a block adjacent to the boundary of images to be coded that are subject to the motion compensation using an image of the overlap region. This way, the image coding device according to the present invention can reduce the amount of data transferred between the coding units, while suppressing the deterioration of the coding efficiency and the image quality.

In addition, each of the plural coding units may include: a motion estimation unit configured to estimate a motion vector for each of plural blocks included in the corresponding one of the plural images to be coded; and a motion compensation unit configured to perform the motion compensation using the motion vector estimated by the motion estimation unit, and each of the plural coding units may be configured to calculate a motion vector of a block adjacent to a boundary between the corresponding one of the plural images to be coded and the overlap region corresponding to the corresponding one of the plural images to be coded, using a motion vector of a neighboring block of the block, and (i) to obtain the second locally decoded image generated by the another one of the plural coding units when the calculated motion vector indicates a direction toward the boundary, and (ii) not to obtain the second locally decoded image generated by the another one of the plural coding units when the calculated motion vector does not indicate the direction toward the boundary.

With this structure, the image coding device according to the present invention does not obtain the second locally decoded image when it is not needed. This way, the image coding device can further reduce the amount of data transferred between the coding units.

The present invention can be realized not only as the image coding device described above, but also as an image coding method which includes the characteristic units of the image coding device as steps, and a program which causes a computer to execute such characteristic steps. It is apparent that such a program can be distributed via a recording medium such as a CD-ROM and a transmission medium such as the Internet.

In addition, the present invention can be realized also as a semiconductor integrated circuit (LSI) which implements some or all of the functions of the image coding device, and a camera including the image coding device.

Advantageous Effects of Invention

According to what is described above, the present invention can provide an image coding device and an image coding method which allow reduction in the amount of data in locally decoded images transferred between adjacent coding units.
(Information Regarding the Technical Background of the Present Application)

The disclosures of Japanese Patent Application No. 2008-131508 filed on May 20, 2008 including specification, drawings and claims are incorporated herein by reference in its entirety.

BRIEF DESCRIPTION OF DRAWINGS

FIG. 1 is a block diagram of a conventional image coding device.

FIG. 2A shows an example of an image processed by a conventional image coding device.

FIG. 7A shows an example of image division by an image coding device according to Embodiment 1 of the present invention in the case of a high pixel rate.

DESCRIPTION OF EMBODIMENTS

Hereinafter, embodiments of the present invention are described with reference to the drawings.
(Embodiment 1)

An image coding device 300 according to Embodiment 1 of the present invention reduces the size of an overlap region used as a part of a search range of motion estimation and motion compensation, when a pixel rate is high. This allows reduction in the amount of data in a locally decoded image to be transferred between coding units, when the pixel rate is high.

First, the structure of the image coding device 300 according to Embodiment 1 of the present invention is described.

Figure 2B:
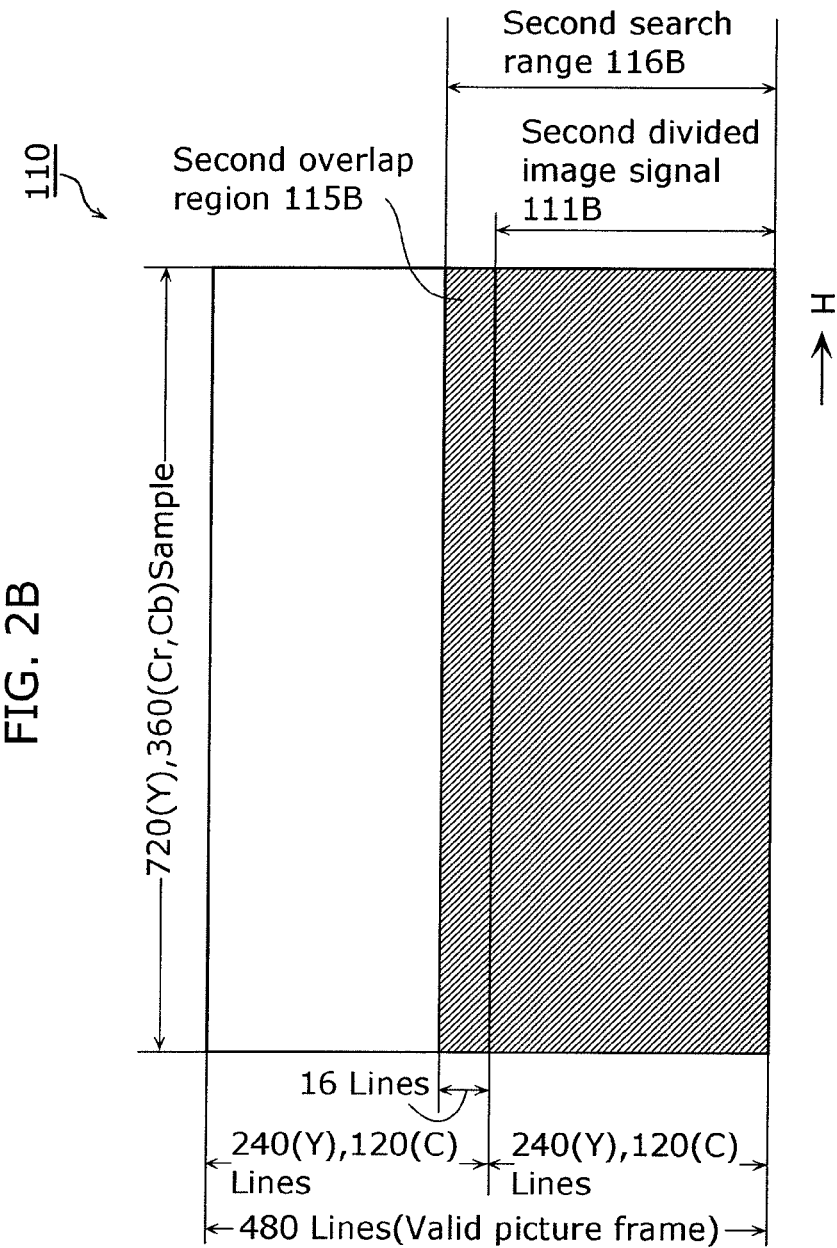
FIG. 2B shows an example of an image processed by a conventional image coding device.
Figure 3:
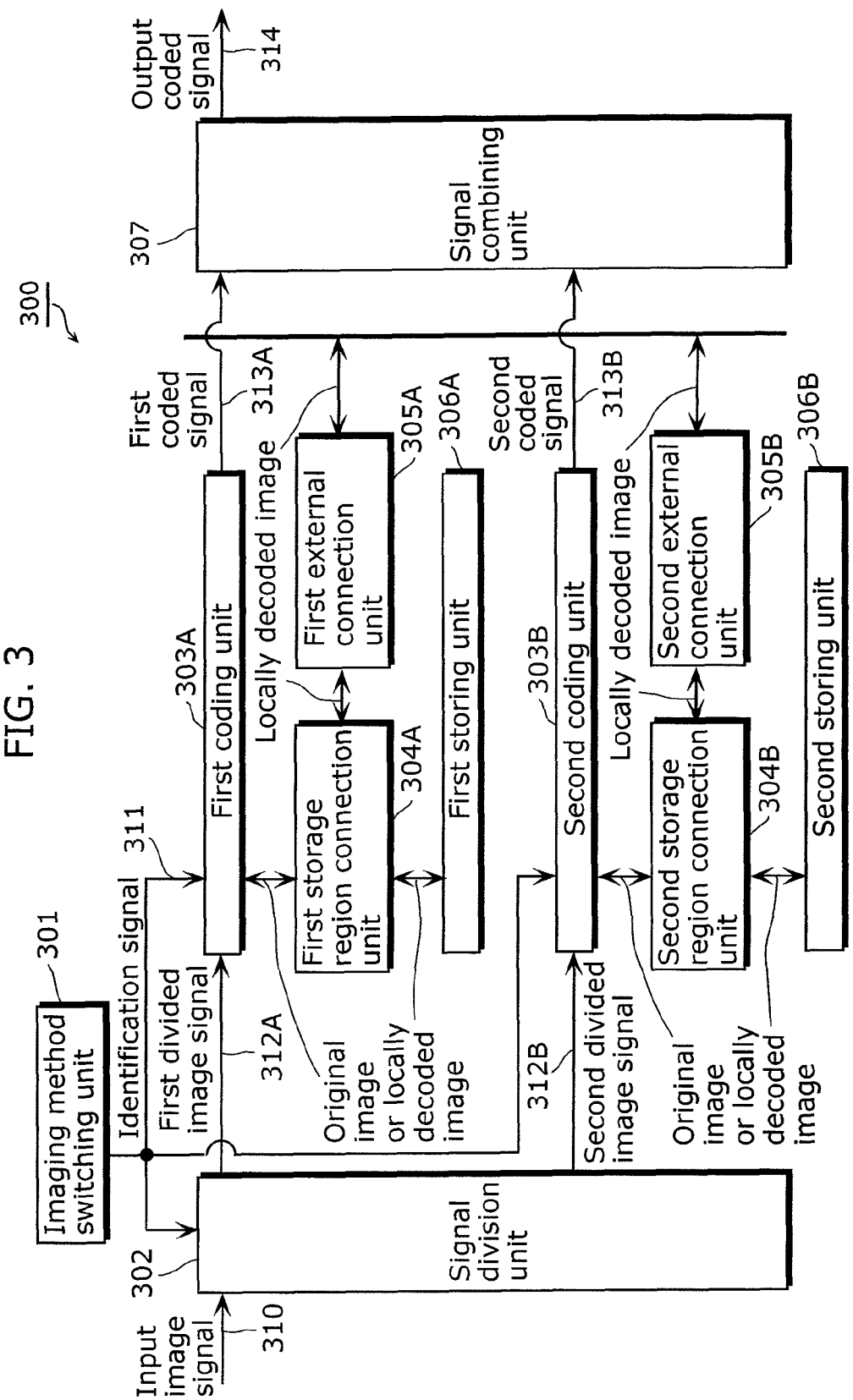
FIG. 3 is a block diagram of an image coding device according to Embodiment 1 of the present invention.

FIG. 3 is a block diagram showing the structure of the image coding device 300 according to Embodiment 1 of the present invention.

The image coding device 300 shown in FIG. 3 is a video coding device that codes an input image signal 310 to generate an output coded signal 314. The input image signal 310 is one of sequential signals each of which includes plural pictures. Examples of the input image signal 310 include a high-definition image signal or an image signal obtained by high-speed imaging. The high-speed imaging refers to imaging performed at a frame rate (300 frames per second, for example) higher than a normal frame rate (30 or 60 frames per second, for example).

The image coding device 300 includes an imaging method switching unit 301, a signal division unit 302, a first coding unit 303A, a second coding unit 303B, a first storage region connection unit 304A, a second storage region connection unit 304B, a first external connection unit 305A, a second external connection unit 305B, a first storing unit 306A, and a second storing unit 306B, and a signal combining unit 307.

The imaging method switching unit 301 is equivalent to the pixel rate obtaining unit of the present invention, and obtains a pixel rate specified by a user operation. More specifically, the imaging method switching unit 301 obtains one of pixel rates varying in i levels, which is determined according to a user's switching operation. Further, the imaging method switching unit 301 outputs an identification signal 311 indicating the determined pixel rate to the signal division unit 302, the first coding unit 303A, and the second coding unit 303B.

Here, a pixel rate refers to the number of pixels to be coded by the image coding device 300 per unit of time. In other words, a pixel rate is equivalent to a processing amount to be coded by the image coding device 300 per unit of time. More specifically, a pixel rate is a product of an image size and a frame rate.

The signal division unit 302 generates a first divided image signal 312A and a second divided image signal 312B by horizontally dividing each picture included in the input image signal 310 into two, for example, while allowing inclusion of an overlap region. Here, a picture refers to a piece of image included in the input image signal 310, and is either a frame or a field.

Figure 4A:
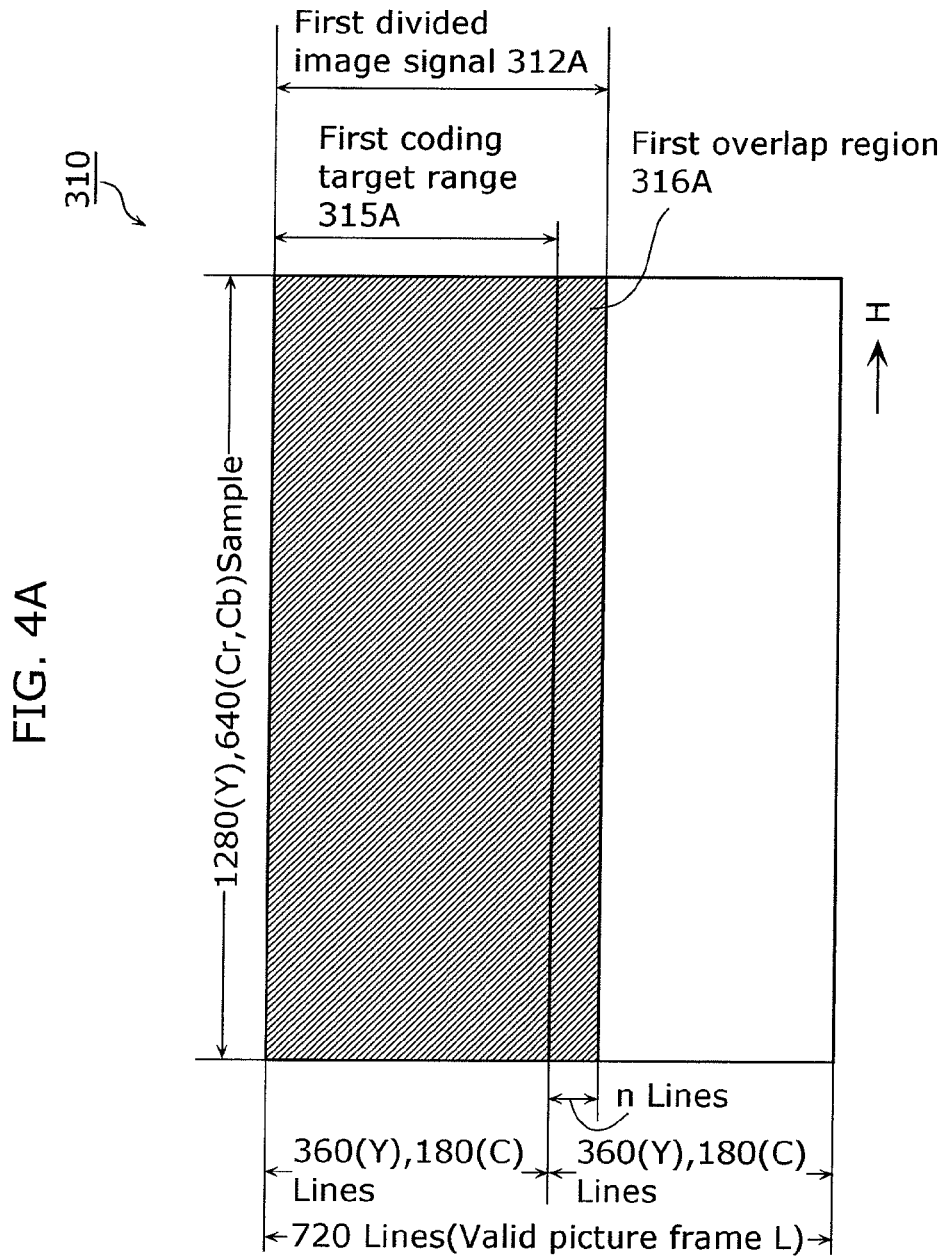
FIG. 4A shows an example of image division by an image coding device according to Embodiment 1 of the present invention.
Figure 4B:
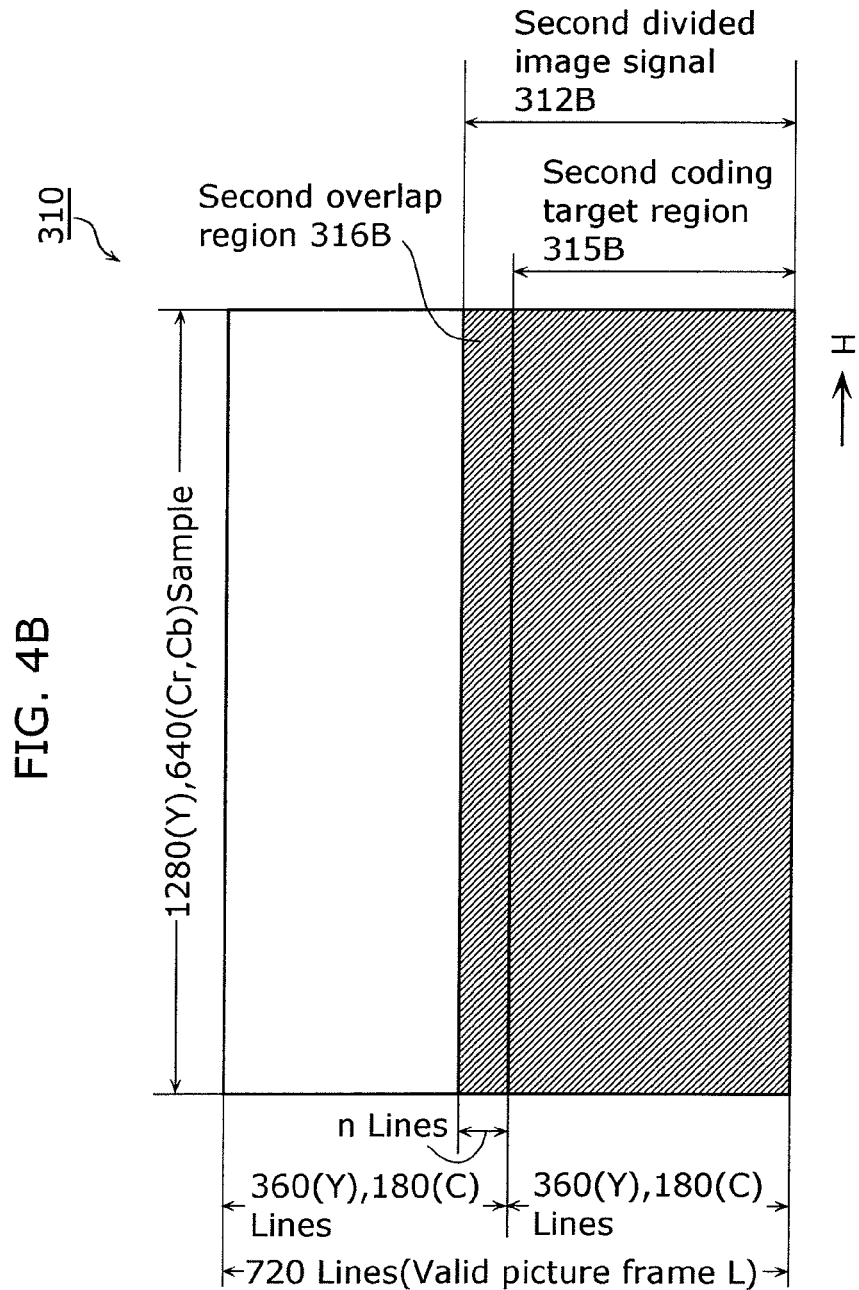
FIG. 4B shows an example of image division by an image coding device according to Embodiment 1 of the present invention.

FIG. 4A shows the structure of the first divided image signal 312A. FIG. 4B shows the structure of the second divided image signal 312B.

As shown in FIG. 4A, the first divided image signal 312A includes a first coding target region 315A and a first overlap region 316A. As shown in FIG. 4B, the second divided image signal 312B includes a second coding target region 315B and a second overlap region 316B.

For example, when the valid picture frame of the input image signal 310 has 720 lines, each of the first coding target region 315A and the second coding target region 315B is a 360-line image region obtained by equally dividing, in the horizontal direction, each picture included in the input image signal 310. The first coding target region 315A is an image region on which the first coding unit 303A performs coding, and the second coding target region 315B is an image region on which the second coding unit 303B performs coding.

The first overlap region 316A is included in the second coding target region 315B and is an n-line image region adjacent to the first coding target region 315A (n is an integer equal to or greater than 1). The second overlap region 316B is included in the first coding target region 315A and is an n-line image region adjacent to the second coding target region 315B (n is an integer equal to or greater than 1).

That is to say, the signal division unit 302 divides each picture included in the input image signal 310 into the first coding target region 315A and the second coding target region 315B.

The first divided image signal 312A corresponds to a motion vector search range of the motion estimation and the motion compensation by the first coding unit 303A, and the second divided image signal 312B corresponds to a motion vector search range of the motion estimation and the motion compensation by the second coding unit 303B. In other words, the signal division unit 302 determines motion vector search ranges of the motion estimation and the motion compensation performed by the first coding unit 303A and the second coding unit 303B.

The signal division unit 302 changes the number of lines n of the first overlap region 316A and the second overlap region 316B in i levels according to the identification signal 311 outputted by the imaging method switching unit 301. More specifically, the signal division unit 302 determines a first size (32 lines, for example) as the size of the first overlap region 316A and the second overlap region 316B when the pixel rate is lower than a predetermined threshold. Further, the signal division unit 302 determines a second size (16 lines, for example) which is smaller than the first size, as the size of the first overlap region 316A and the second overlap region 316B when the pixel rate is equal to or higher than the predetermined threshold.

In addition, the signal division unit 302 outputs the first divided image signal 312A to the first coding unit 303A, and the second divided image signal 312B to the second coding unit 303B.

The first coding unit 303A generates a first coded signal 313A by coding the first coding target region 315A included in the first divided image signal 312A generated by the signal division unit 302. Further, the first coding unit 303A outputs the first coded signal 313A to the signal combining unit 307.

The second coding unit 303B generates a second coded signal 313B by coding the second coding target region 315B included in the second divided image signal 312B generated by the signal division unit 302. Further, the second coding unit 303B outputs the second coded signal 313B to the signal combining unit 307.

The first coding unit 303A also generates a first locally decoded image 317A by decoding the coded first coding target region 315A. The second coding unit 303B also generates a first locally decoded image 317B by decoding the coded second coding target region 315B. That is to say, locally decoded images are the same as the images generated by a decoding device through decoding of the output coded signal 314.

The first storing unit 306A is used as a line memory or a frame memory when the first coding unit 303A performs coding. The first storing unit 306A stores, as reference images, an original image (the first divided image signal 312A), the first locally decoded image 317A, and a second locally decoded image 318A which corresponds to the first overlap region 316A. The first coding unit 303A reads out, from the first storing unit 306A, a previous first divided image signal 312A, a previous first locally decoded image 317A, and a previous second locally decoded image 318A as reference images, and codes a current picture using them. Further, the first coding unit 303A writes the first divided image signal 312A and the first locally decoded image 317A of the current picture in the first storing unit 306A as reference images to be used for coding a subsequent picture.

The second storing unit 306B is used as a line memory or a frame memory when the second coding unit 303B performs coding. The second storing unit 306B stores, as reference images, an original image (the second divided image signal 312B), the first locally decoded image 317B, and a second locally decoded image 318B which corresponds to the second overlap region 316B. The second coding unit 303B reads out, from the second storing unit 306B, a previous second divided image signal 312B, a previous first locally decoded image 317B, and a previous second locally decoded image 318B as reference images, and codes a current picture using them. Further, the second coding unit 303B writes the second divided image signal 312B and the first locally decoded image 317B of the current picture in the second storing unit 306B as reference images to be used for coding a subsequent picture.

The first external connection unit 305A reads out the second locally decoded image 318A included in the first locally decoded image 317B stored in the second storing unit 306B, and writes the second locally decoded image 318A in the first storing unit 306A. The second external connection unit 305B reads out the second locally decoded image 318B included in the first locally decoded image 317A stored in the first storing unit 306A, and writes the second locally decoded image 318B in the second storing unit 306B.

The first storage region connection unit 304A exchanges data between the first coding unit 303A, the first storing unit 306A, and the first external connection unit 305A. The second storage region connection unit 304B exchanges data between the second coding unit 303B, the second storing unit 306B, and the second external connection unit 305B.

The signal combining unit 307 generates the output coded signal 314, which is a single bit stream, by combining the first coded signal 313A generated by the first coding unit 303A and the second coded signal 313B generated by the second coding unit 303B.

Next, operations of the image coding device 300 are described. First, an overview of an operational flow of the image coding device 300 is described.

Figure 5:
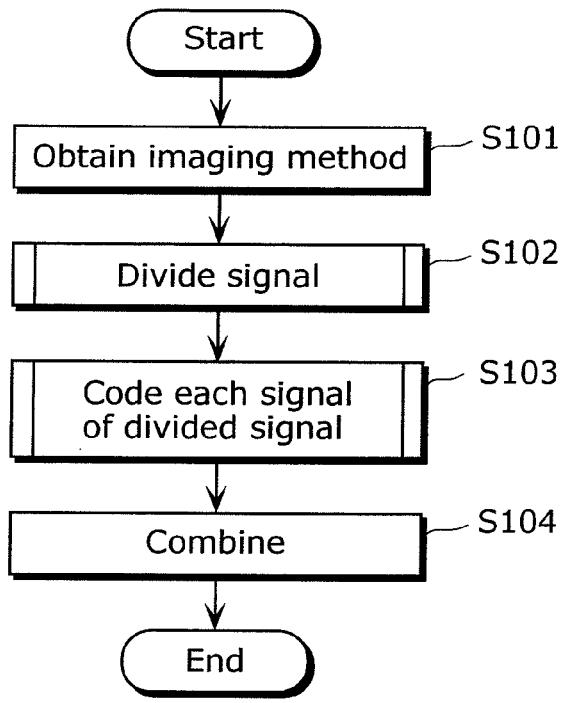
FIG. 5 is a flowchart of processing by an image coding device according to Embodiment 1 of the present invention.

FIG. 5 is a flowchart showing an operational flow of the image coding device 300 according to Embodiment 1 of the present invention.

As shown in FIG. 5, first, the imaging method switching unit 301 obtains one of pixel rates varying in i levels, which is determined according to a user's switching operation or the like (S101). For the purpose of simplifying the description, the following shows an example of switching pixel rates in two levels. More specifically, a low-pixel-rate imaging method in which the pixel rate is low is set when i=0, whereas a high-pixel-rate imaging method in which the pixel rate is high is set when i=1.

Further, the imaging method switching unit 301 generates the identification signal 311 indicating a determined pixel rate.

Next, the signal division unit 302 generates the first divided image signal 312A and the second divided image signal 312B by dividing each picture included in the input image signal 310 into two (S102).

Next, the first coding unit 303A generates the first coded signal 313A by coding the first divided image signal 312A, and the second coding unit 303B generates the second coded signal 313B by coding the second divided image signal 312B (S103).

Next, the signal combining unit 307 generates the output coded signal 314 by combining the first coded signal 313A and the second coded signal 313B (S104).

Next, detailed operations involved in the signal division (S102) are described.

Figure 6:
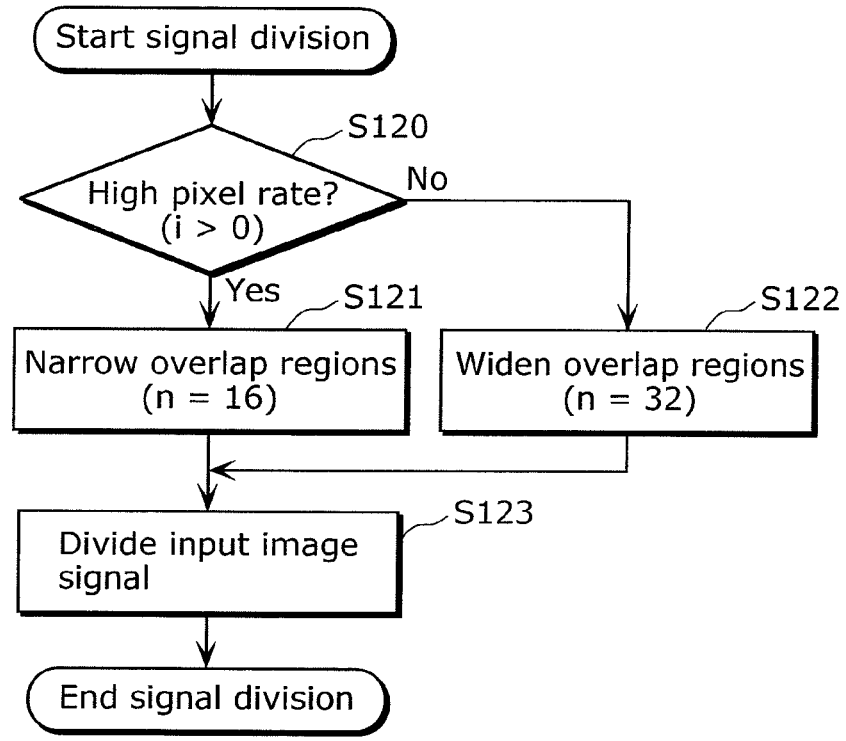
FIG. 6 is a flowchart of image division by an image coding device according to Embodiment 1 of the present invention.

FIG. 6 is a flowchart showing a processing flow of the signal division by the signal division unit 302.

As shown in FIG. 6, first, the signal division unit 302 refers to the identification signal 311 to determine which one of the low-pixel-rate imaging method and the high-pixel-rate imaging method is set (S120).

When the high-pixel-rate imaging method is set (Yes in S120), the signal division unit 302 narrows the first overlap region 316A and the second overlap region 316B (S121).

Next, the signal division unit 302 divides the input image signal 310 to generate the first divided image signal 312A including the first overlap region 316A, the size of which has been determined in Step S121, and the second divided image signal 312B including the second overlap region 316B, the size of which has been determined in Step S121 (S123).

On the other hand, when the low-pixel-rate imaging method is set (No in S120), the signal division unit 302 widens the first overlap region 316A and the second overlap region 316B (S122).

Next, the signal division unit 302 divides the input image signal 310 to generate the first divided image signal 312A including the first overlap region 316A, the size of which has been determined in Step S122, and the second divided image signal 312B including the second overlap region 316B, the size of which has been determined in Step S122 (S123).

Figure 7B:
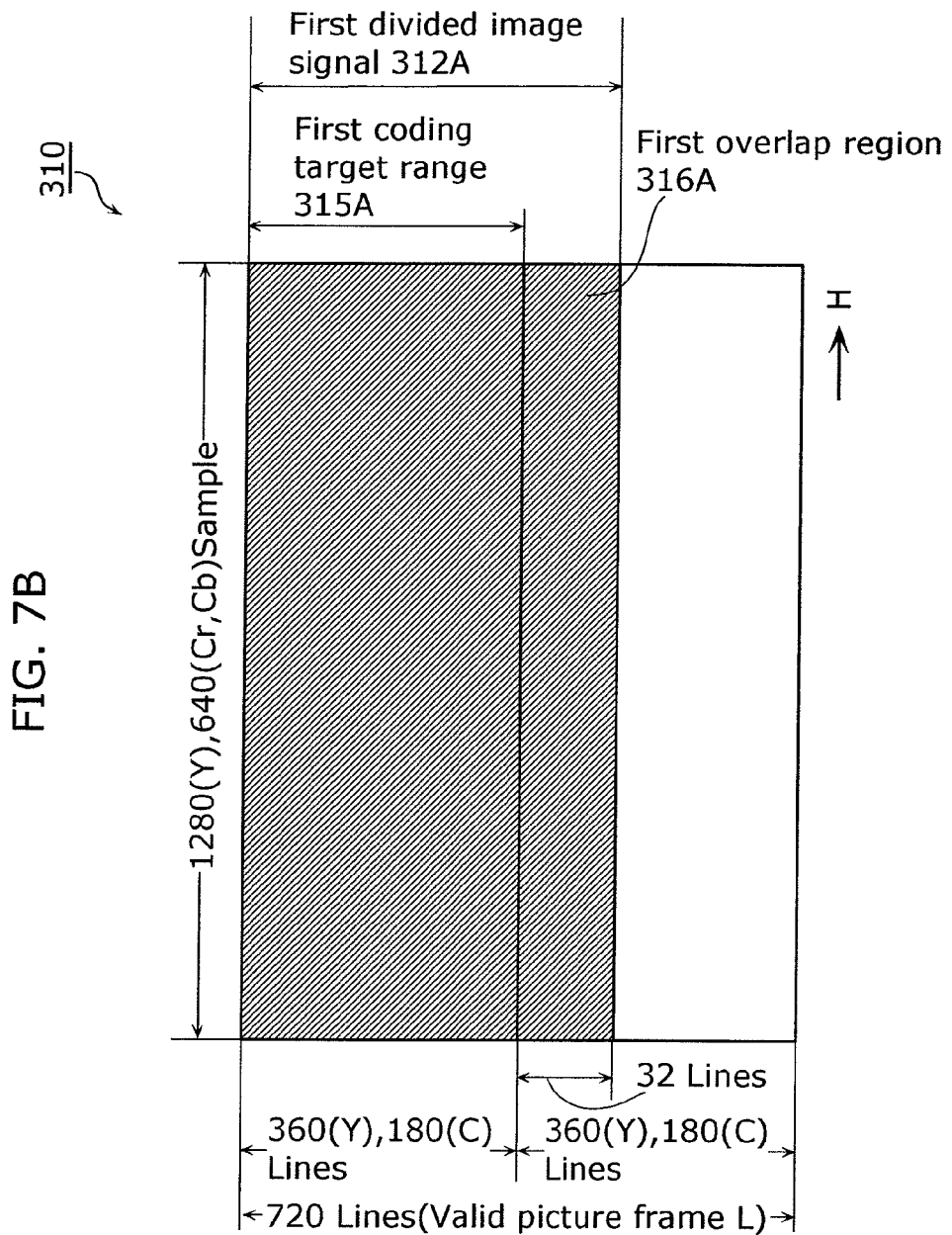
FIG. 7B shows an example of image division by an image coding device according to Embodiment 1 of the present invention in the case of a low pixel rate.

FIG. 7A shows an example of the first divided image signal 312A when the high-pixel-rate imaging method is set. FIG. 7B shows an example of the first divided image signal 312A when the low-pixel-rate imaging method is set.

As shown in FIG. 7A, the number of lines n of the first overlap region 316A is determined to be "16", for example, when the high-pixel-rate imaging method is set. Further, as shown in FIG. 7B, the number of lines n of the first overlap region 316A is determined to be "32", for example, when the low-pixel-rate imaging method is set. The same holds true for the number of lines n of the second overlap region 316B.

Next, the coding processing performed by the first coding unit 303A and the second coding unit 303B is described.

It is to be noted that the first coding unit 303A, the first storage region connection unit 304A, the first external connection unit 305A, and the first storing unit 306A have the same structure as the second coding unit 303B, the second storage region connection unit 304B, the second external connection unit 305B, and the second storing unit 306B, respectively. Thus, only the operations and structures of the first coding unit 303A, the first storage region connection unit 304A, the first external connection unit 305A, and the first storing unit 306A are hereinafter described.

First, the detailed structure of the first coding unit 303A is described.

Figure 8:
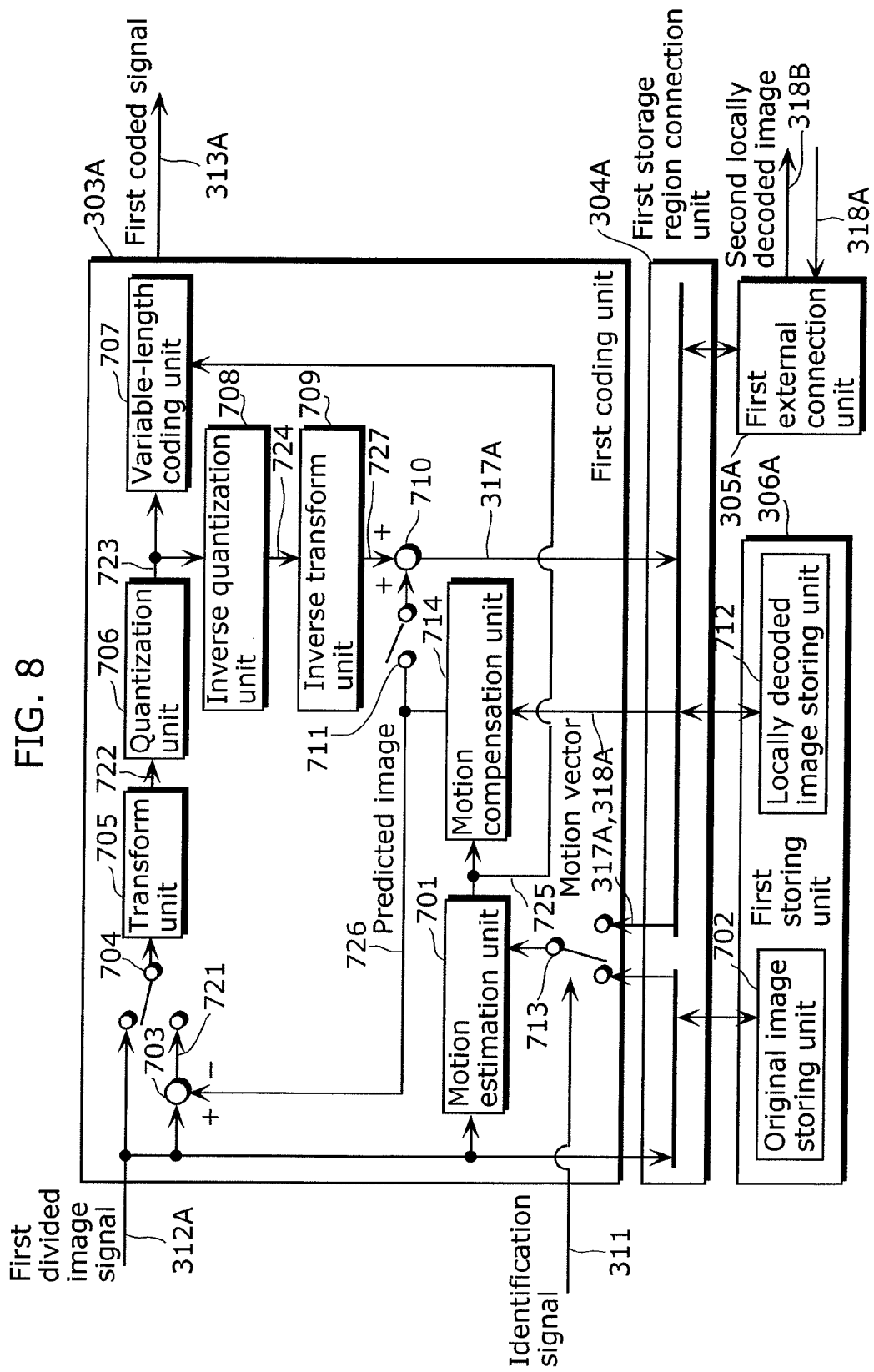
FIG. 8 is a block diagram of a first coding unit according to Embodiment 1 of the present invention.

FIG. 8 is a block diagram showing the structures of the first coding unit 303A, the first storage region connection unit 304A, the first external connection unit 305A, and the first storing unit 306A.

As shown in FIG. 8, the first storing unit 306A includes an original image storing unit 702 and a locally decoded image storing unit 712.

The original image storing unit 702 stores the original image (the first divided image signal 312A). The locally decoded image storing unit 712 stores the first locally decoded image 317A and the second locally decoded image 318A.

The first coding unit 303A includes a motion estimation unit 701, a subtraction unit 703, switches 704, 711, and 713, a transform unit 705, a quantization unit 706, a variable-length coding unit 707, an inverse quantization unit 708, an inverse transform unit 709, an addition unit 710, and a motion compensation unit 714.

The switch 713 outputs, to the motion estimation unit 701, either the original image (the first divided image signal 312A) stored in the original image storing unit 702 or the first locally decoded image 317A and the second locally decoded image 318A stored in the locally decoded image storing unit 712. More specifically, the switch 713 outputs the first locally decoded image 317A and the second locally decoded image 318A to the motion estimation unit 701 when the identification signal 311 indicates the low-pixel-rate imaging method, and outputs the original image to the motion estimation unit 701 when the identification signal 311 indicates the high-pixel-rate imaging method.

Here, the first divided image signal 312A includes an I-picture (Intra-picture) and a P-picture (Inter-picture). I-picture is a picture on which intra-coding is performed using data of the same I-picture. P-picture is a picture on which inter-coding is performed using data of another picture.

When a current picture to be coded (hereinafter referred to as a current picture) included in the first divided image signal 312A is a P-picture, the motion estimation unit 701 generates a motion vector 725 by performing the motion estimation on the current picture using another picture. Here, another picture is a picture included in the original image or the locally decoded image (the first locally decoded image 317A and the second locally decoded image 318A) outputted by the switch 713.

More specifically, when the pixel rate is equal to or higher than a predetermined threshold, the motion estimation unit 701 estimates the motion vector 725 of the current picture using the original image stored in the original image storing unit 702. On the other hand, when the pixel rate is lower than the predetermined threshold, the motion estimation unit 701 estimates the motion vector 725 of the current picture using the first locally decoded image 317A and the second locally decoded image 318A stored in the locally decoded image storing unit 712.

Here, the motion estimation refers to processing of searching for, for each image block included in the current picture, an image block in a previous picture resembling the image block, and then calculating the amount and direction of motion (the motion vector 725) of the image included in the image block from the previous picture.

The motion compensation unit 714 generates a predicted image 726 by performing the motion compensation using the motion vector 725 generated by the motion estimation unit 701 and another picture included in the first locally decoded image 317A and the second locally decoded image 318A stored in the locally decoded image storing unit 712.

Here, the motion compensation refers to processing of generating the predicted image 726 corresponding to an image of the current picture by spatially shifting an image included in the previous picture by the amount of motion indicated by the motion vector 725.

The subtraction unit 703 subtracts the predicted image 726 from the current picture included in the first divided image signal 312A to generate a prediction error signal 721.

When the current picture included in the first divided image signal 312A is a P-picture, the switch 704 outputs, to the transform unit 705, the prediction error signal 721 generated by the subtraction unit 703. Whereas, when the current picture is an I-picture, the switch 704 outputs the first divided image signal 312A to the transform unit 705.

The transform unit 705 generates DCT coefficients 722 by performing DCT (orthogonal transform) on the prediction error signal 721 or the first divided image signal 312A outputted by the switch 704. Here, the DCT refers to processing of performing spatial-to-frequency transform on an input signal.

The quantization unit 706 quantizes the DCT coefficients 722 generated by the transform unit 705, so as to generate quantized coefficients 723. More specifically, the quantization unit 706 generates the quantized coefficients 723 by dividing the DCT coefficients 722 by a quantization value Q.

The variable-length coding unit 707 performs invertible variable-length coding on the quantized coefficients 723 generated by the quantization unit 706, so as to generate the first coded signal 313A, the amount of information of which is compressed as compared to the first divided image signal 312A.

The inverse quantization unit 708 performs inverse quantization on the quantized coefficients 723 generated by the quantization unit 706, so as to generate DCT coefficients 724. To be more specific, the inverse quantization unit 708 generates the DCT coefficients 724 by multiplying the quantized coefficients 723 by the quantization value Q used by the quantization unit 706. Here, the quantization of the DCT coefficients 722 always generates a quantization error. To address such a quantization error, the inverse quantization by the inverse quantization unit 708 allows generation of a signal which is equivalent to the DCT coefficients 722 added with the quantization error, that is, generation of the DCT coefficients 724 equal to the DCT coefficients to be generated in the process of decoding performed by a decoding device.

The inverse transform unit 709 performs inverse DCT on the DCT coefficients 724 generated by the inverse quantization unit 708, so as to generate a locally decoded signal 727 equivalent to the original first divided image signal 312A added with quantization distortion.

When the current picture included in the first divided image signal 312A is a P-picture, the switch 711 supplies the addition unit 710 with the predicted image 726 generated by the motion compensation unit 714. Whereas, the switch 711 is released when the current picture is an I-picture.

When the current picture included in the first divided image signal 312A is a P-picture, the addition unit 710 generates the first locally decoded image 317A by adding the locally decoded signal 727 generated by the inverse transform unit 709 and the predicted image 726 outputted by the switch 711. When the current picture is an I-picture, the addition unit 710 outputs, as the first locally decoded image 317A, the locally decoded signal 727 generated by the inverse transform unit 709. The first locally decoded image 317A generated by the addition unit 710 is stored in the locally decoded image storing unit 712.

Next, an operational flow of the coding processing (S103) performed by the first coding unit 303A is described.

Figure 9:
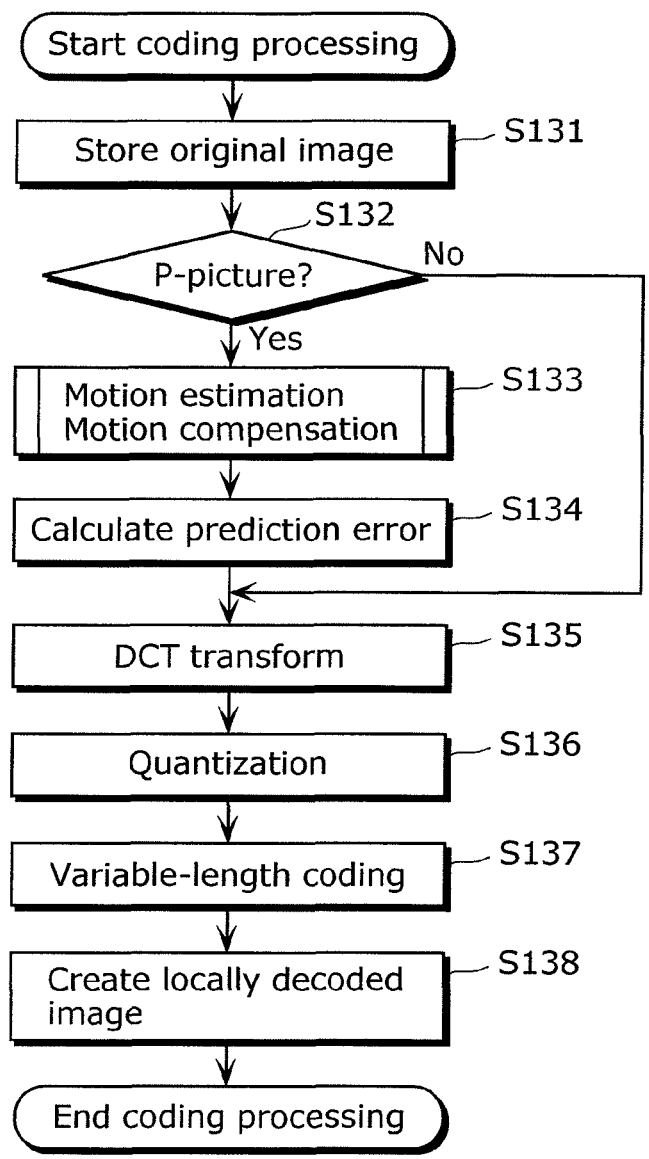
FIG. 9 is a flowchart of coding processing by an image coding device according to Embodiment 1 of the present invention.

FIG. 9 is a flowchart showing an operational flow of the coding processing (S103) performed by the first coding unit 303A on a current picture included in the first divided image signal 312A.

As shown in FIG. 9, the first coding unit 303A writes a current picture included in the first divided image signal 312A into the original image storing unit 702 via the first storage region connection unit 304A, with no processing performed on the original image (S131). The stored original image is to be used as a reference image in the motion vector estimation on a subsequent picture. The timing of writing the current picture in the original image storing unit 702 is not limited to the timing shown in FIG. 9, and may be any timing.

Next, the first coding unit 303A determines whether the current picture included in the first divided image signal 312A is an I-picture or a P-picture (S132).

When the current picture is an I-picture (No in S132), the first divided image signal 312A is supplied to the motion estimation unit 701. At this time, the motion estimation unit 701 does not perform vector calculation on the current picture.

Further, in the case of processing an I-picture, the switch 704 outputs the first divided image signal 312A to the transform unit 705. The transform unit 705 transforms the first coding target region 315A of the current picture included in the first divided image signal 312A into the DCT coefficients 722 (S135).

Next, the quantization unit 706 quantizes the DCT coefficients 722 to generate the quantized coefficients 723 (S136). Next, the variable-length coding unit 707 performs the variable-length coding on the quantized coefficients 723 to generate the first coded signal 313A (S137).

The above processing generates the first coded signal 313A, into which the data amount of the first coding target region 315A of the current picture is compressed.

Meanwhile, the inverse quantization unit 708 performs the inverse quantization on the quantized coefficients 723 generated in Step S136, so as to generates the DCT coefficients 724. Next, the inverse transform unit 709 performs the inverse DCT on the DCT coefficients 724 to generate the locally decoded signal 727.

In the case of processing an I-picture, the switch 711 is released and thus the addition unit 710 performs no addition on the locally decoded signal 727 generated by the inverse DCT. The locally decoded signal 727 is written as-is in the locally decoded image storing unit 712 via the first storage region connection unit 304A as the first locally decoded image 317A (S138).

Figure 10:
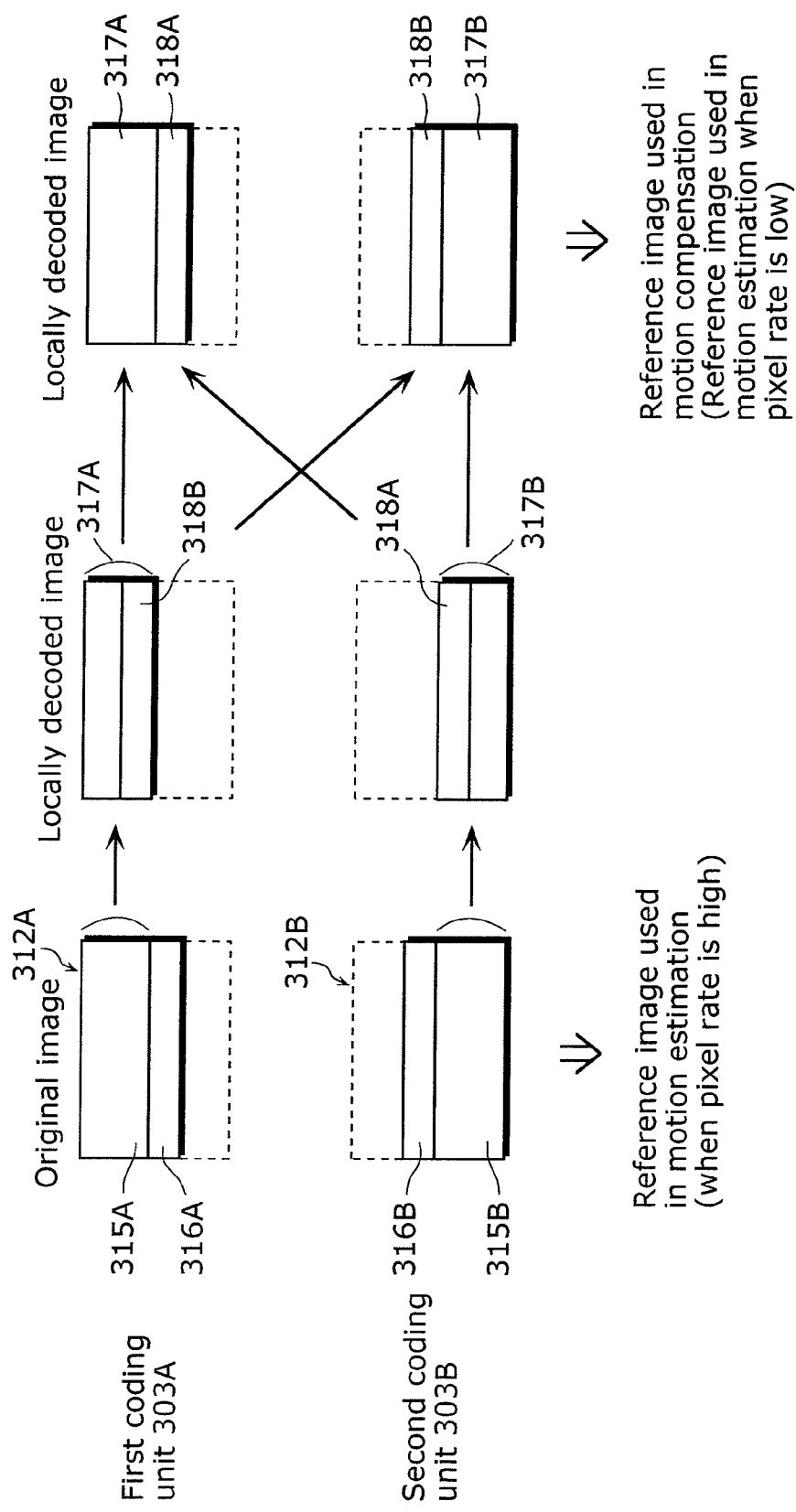
FIG. 10 shows usage statuses of original images and locally decoded images of an image coding device according to Embodiment 1 of the present invention.

FIG. 10 shows relationships between original images and locally decoded images. As shown in FIG. 10, the first coding unit 303A generates the first locally decoded image 317A corresponding to the first coding target region 315A included in the original image of the current picture, and the locally decoded image storing unit 712 of the first coding unit 303A stores the first locally decoded image 317A. The first locally decoded image 317A includes the second locally decoded image 318B which corresponds to the second overlap region 316B used by the second coding unit 303B.

It is to be noted that the creation of the first locally decoded image 317A (S138) and the variable-length coding (S137) may be performed in any order. Further, the creation of the first locally decoded image 317A (S138) and the variable-length coding (S137) may be performed simultaneously in at least a part of the processing.

Next, the coding of a P-picture is described.

When the current picture is a P-picture in Step S132 (Yes in S132), the motion estimation unit 701 performs the motion estimation and the motion compensation on the current picture (S133).

Figure 11:
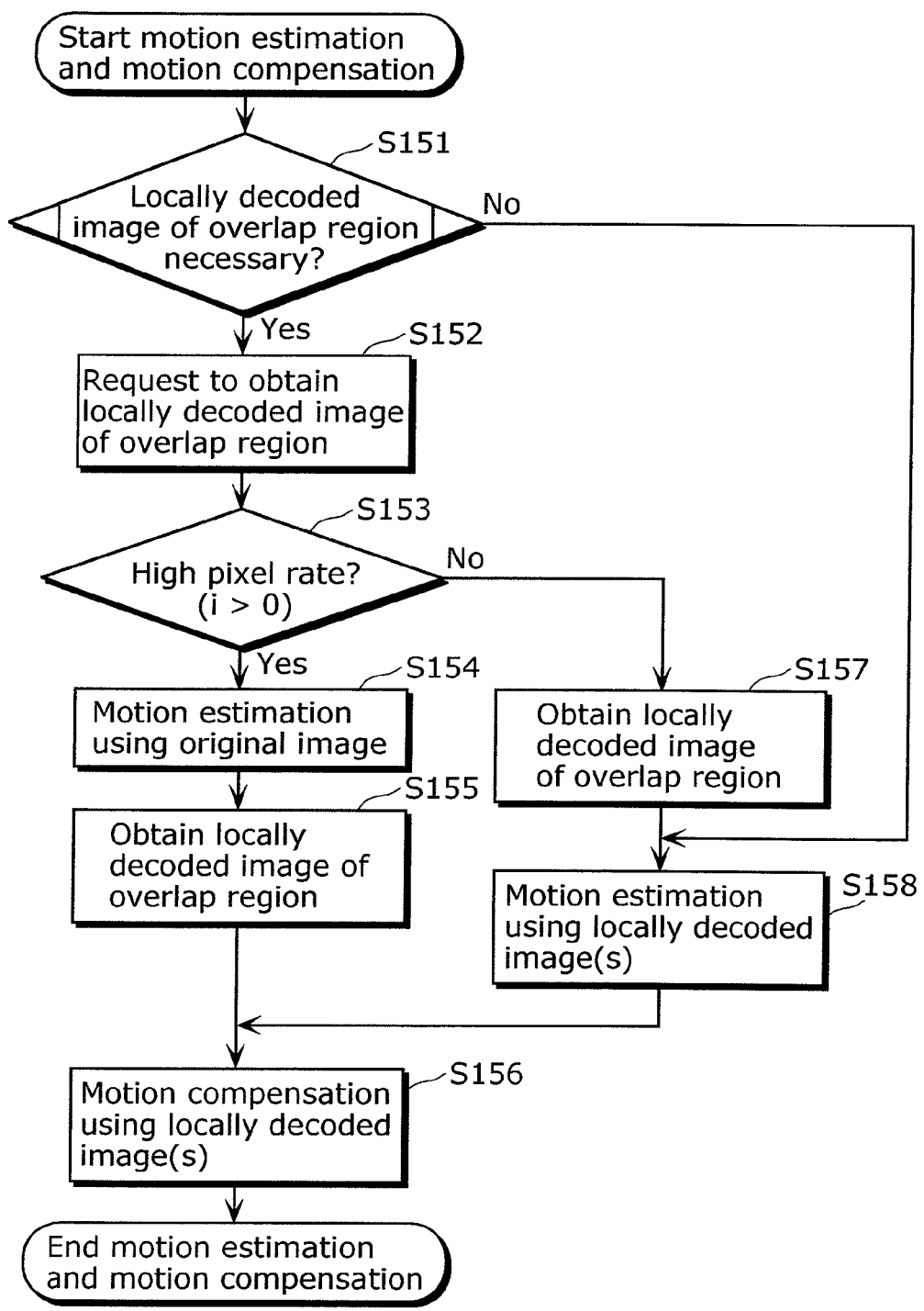
FIG. 11 is a flowchart of motion estimation and motion compensation by an image coding device according to Embodiment 1 of the present invention.

FIG. 11 is a flowchart showing a flow of the motion estimation and the motion compensation performed by the first coding unit 303A (S133).

First, the first coding unit 303A determines whether or not the locally decoded image corresponding to the first overlap region 316A is necessary (S151). Details of Step S151 are described later.

When the second locally decoded image 318A corresponding to the first overlap region 316A is necessary (Yes in S151), the first coding unit 303A outputs a transfer request to the locally decoded image storing unit 712 included in the second storing unit 306B via the first external connection unit 305A and the second external connection unit 305B, so as to request the locally decoded image storing unit 712 to transfer the second locally decoded image 318A corresponding to the first overlap region 316A stored in the locally decoded image storing unit 712 (S152).

Next, when the identification signal 311 indicates the high-pixel-rate imaging method (Yes in S153), the switch 713 outputs the original image stored in the original image storing unit 702 to the motion estimation unit 701. Next, the motion estimation unit 701 calculates the motion vector 725 by performing the motion estimation using the original image outputted by the switch 713 (S154). As shown in FIG. 10, the search range used in the motion estimation includes the first coding target region 315A (360 lines) and the first overlap region 316A (16 lines) of the original image.

Meanwhile, the first coding unit 303A obtains the second locally decoded image 318A that is outputted by the locally decoded image storing unit 712 in the second storing unit 306B in response to the transfer request in S152, and stores the obtained second locally decoded image 318A in the locally decoded image storing unit 712 as a reference image (S155).

Next, as shown in FIG. 10, the motion compensation unit 714 generates the predicted image 726 by performing the motion compensation using the first locally decoded image 317A and the second locally decoded image 318A stored in the locally decoded image storing unit 712 (S156).

Meanwhile, when the identification signal 311 indicates the lower-pixel-rate imaging method (No in S153), first, the first coding unit 303A obtains the second locally decoded image 318A outputted by the locally decoded image storing unit 712 in the second storing unit 306B in response to the transfer request in S152, and stores the obtained second locally decoded image 318A in the locally decoded image storing unit 712 as a reference image (S157).

Here, the switch 713 outputs the original image stored in the original image storing unit 702 to the motion estimation unit 701. It is to be noted that the motion estimation unit 701 may obtain the original image directly from the first divided image signal 312A. Next, the motion estimation unit 701 calculates the motion vector 725 by performing the motion estimation using the first locally decoded image 317A and the second locally decoded image 318A outputted by the switch 713 (S158). As shown in FIG. 10, the search range used in the motion estimation includes the first locally decoded image 317A and the second locally decoded image 318A which correspond to the first coding target region 315A (360 lines) and the first overlap region 316A (32 lines), respectively.

Next, as shown in FIG. 10, the motion compensation unit 714 generates the predicted image 726 by performing the motion compensation using the first locally decoded image 317A and the second locally decoded image 318A stored in the locally decoded image storing unit 712 (S156).

On the other hand, when the second locally decoded image 318A corresponding to the first overlap region 316A is not necessary (No in S151), the motion estimation unit 701 calculates the motion vector 725 by performing the motion estimation using the first locally decoded image 317A outputted by the switch 713 (S158).

Next, the motion compensation unit 714 generates the predicted image 726 by performing the motion compensation using the first locally decoded image 317A stored in the locally decoded image storing unit 712 (S156).

After Step S156, the subtraction unit 703 generates the prediction error signal 721 by subtracting the predicted image 726 from the original image as shown in FIG. 9 (S134).

Next, the quantization unit 706 quantizes the DCT coefficients 722 to generate the quantized coefficients 723 (S136). Next, the variable-length coding unit 707 performs the variable-length coding on the quantized coefficients 723 to generate the first coded signal 313A (S137).

The above processing generates the first coded signal 313A, into which the data amount of the first coding target region 315A of the current picture is compressed.

Meanwhile, the inverse quantization unit 708 performs the inverse quantization on the quantized coefficients 723 generated in Step S136, so as to generate the DCT coefficients 724. Next, the inverse transform unit 709 performs the inverse DCT on the DCT coefficients 724 to generate the locally decoded signal 727.

In the case of processing a P-picture, the switch 711 outputs the predicted image 726 to the addition unit 710. The addition unit 710 adds the locally decoded signal 727 and the predicted image 726 to generate the first locally decoded image 317A. Then, the addition unit 710 writes the first locally decoded image 317A in the locally decoded image storing unit 712 via the first storage region connection unit 304A (S138).

Figure 12:
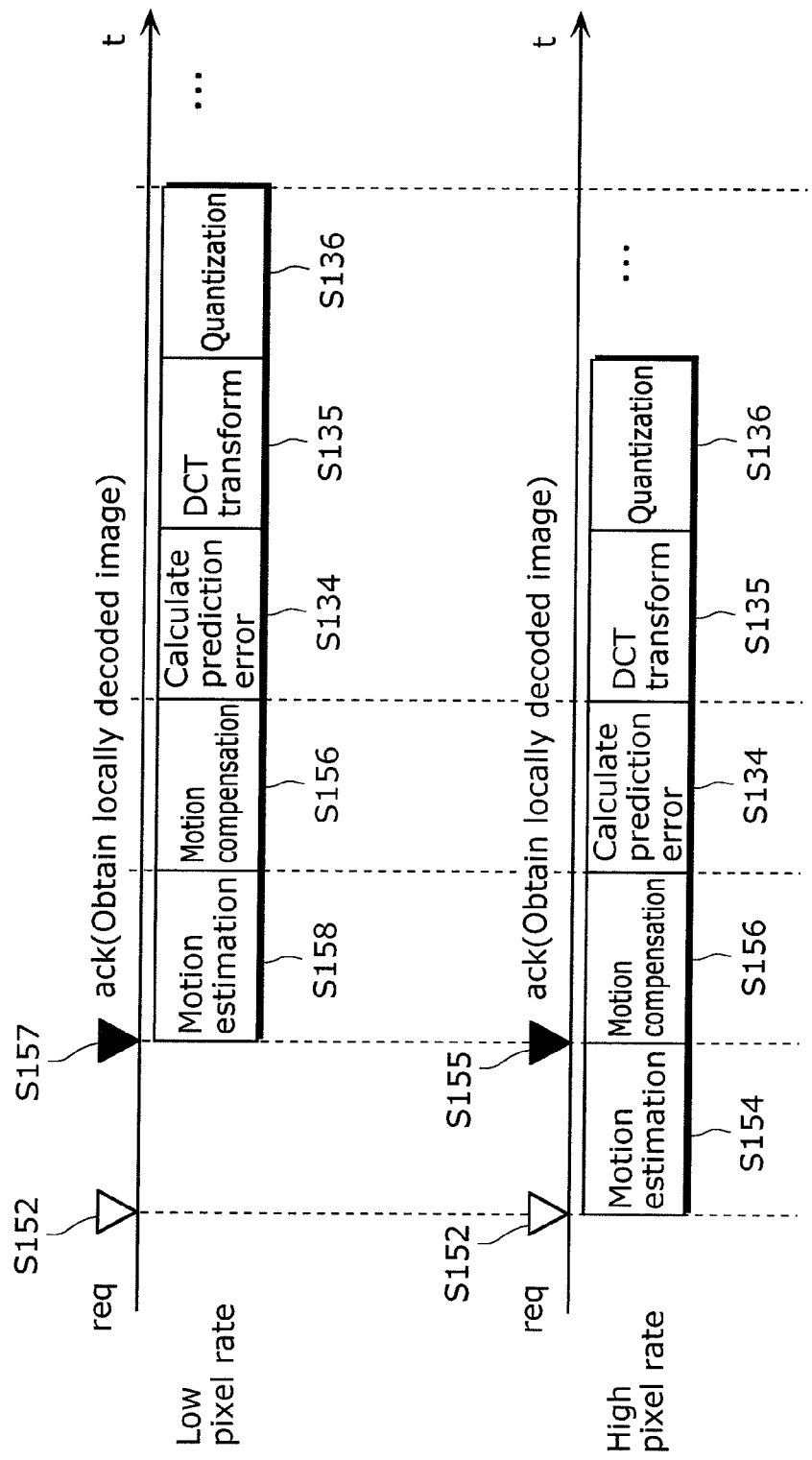
FIG. 12 is a timing diagram showing an example of signal processing by an image coding device according to Embodiment 1 of the present invention.

FIG. 12 shows a processing time in the case of a lower pixel rate and a processing time in the case of a higher pixel rate.

As shown in FIG. 12, in the case of a higher pixel rate, the motion estimation unit 701 starts estimating a motion vector using the original image stored in the original image storing unit 702 (S154), before the first coding unit 303A obtains the second locally decoded image 318A outputted by the second coding unit 303B in response to the transfer request issued in Step S152 (prior to S155). The image coding device 300 can increase the processing speed by performing the motion estimation using the original image stored in the first storing unit 306A without waiting for the second locally decoded image 318A as described.

Next is a description of the determination as to whether or not the second locally decoded image 318A corresponding to the first overlap region 316A is necessary (S151).

Figure 13:
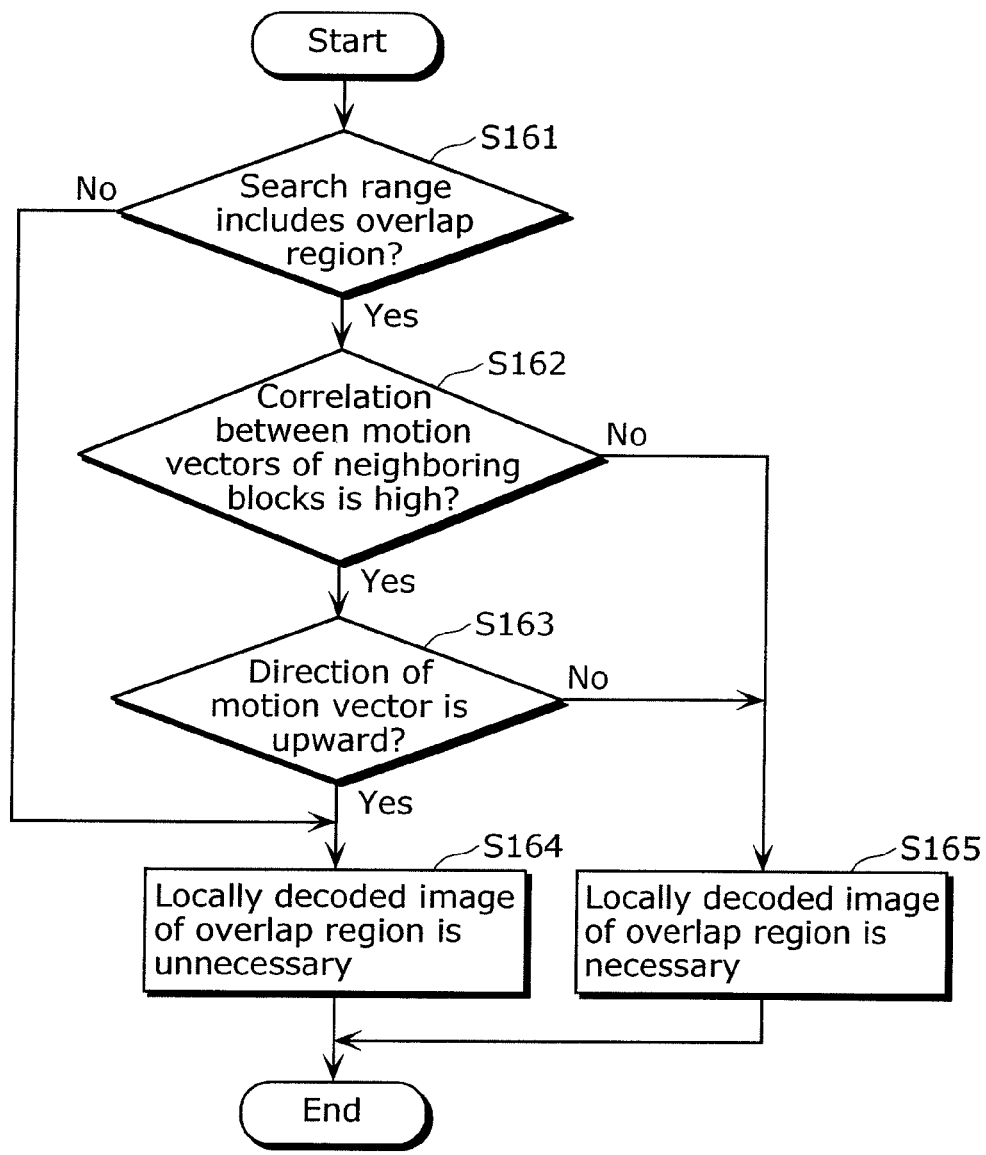
FIG. 13 is a flowchart of determination as to whether or not a locally decoded image is necessary, performed by an image coding device according to Embodiment 1 of the present invention.

FIG. 13 is a flowchart showing a processing flow of the determination as to whether or not the second locally decoded image 318A corresponding to the first overlap region 316A is necessary. It is to be noted that the processing shown in FIG. 13 is performed for each block to be processed included in the first coding target region 315A.

First, the first coding unit 303A determines whether or not the search range of a current block to be processed includes the first overlap region 316A (S161).

When the search range of the current block to be processed does not include the first overlap region 316A (No in S161), the first coding unit 303A determines that the second locally decoded image 318A corresponding to the first overlap region 316A is not necessary (S164).

On the other hand, when the search range of the current block to be processed includes the first overlap region 316A (Yes in S161), the first coding unit 303A determines whether or not correlation between previously calculated motion vectors of neighboring blocks is high (S162). More specifically, the first coding unit 303A determines whether or not the correlation between the motion vectors of the neighboring blocks is equal to or greater than a predetermined threshold.

When the correlation between the motion vectors of the neighboring blocks is high (Yes in S162), the first coding unit 303A estimates (calculates) a motion vector of a block adjacent to a dividing boundary, which is a boundary between the first coding target region 315A and the first overlap region 316A, using the motion vectors of the blocks neighboring the block adjacent to the dividing boundary. Next, the first coding unit 303A determines whether or not the direction of the estimated motion vector is upward (direction opposite to the first overlap region 316A) (S163).

Figure 14:
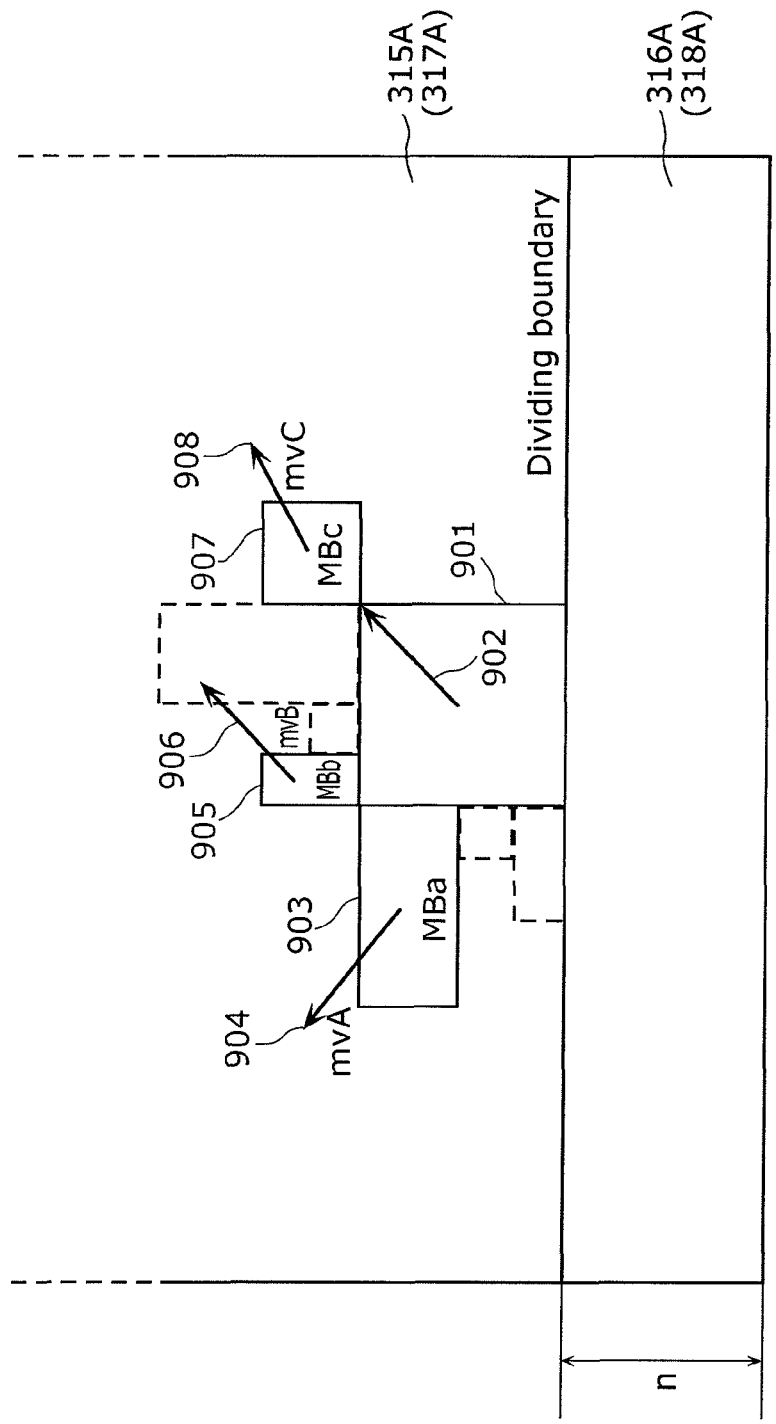
FIG. 14 shows motion vector estimation by an image coding device according to Embodiment 1 of the present invention.

FIG. 14 shows an example of motion vectors of blocks located near the dividing boundary between the first coding target region 315A and the first overlap region 316A.

Here, the motion vector of a given block is highly correlated with the motion vectors of the neighboring blocks, allowing the estimation of the motion vector of the given block using the motion vectors of the neighboring blocks. For example, as shown in FIG. 14, a motion vector 902 of a coding block 901 to be processed can be estimated using motion vectors 904, 906, and 908 of adjacent blocks 903, 905, and 907 that are adjacent to the coding block 901. In this case, the first coding unit 303A estimates that the direction of the motion vector 902 is upward by calculating an average of horizontal and vertical components of the motion vectors 904, 906, and 908 of the adjacent blocks.

When the direction of the estimated motion vector is upward (Yes in S163), the moving destination in the motion compensation is not the first overlap region 316A, which means that the motion compensation can be performed using only the first locally decoded image 317A generated by the first coding unit 303A. Accordingly, the first coding unit 303A determines that the second locally decoded image 318A corresponding to the first overlap region 316A is not necessary (S164).

On the other hand, when the correlation between the motion vectors of the neighboring blocks is low (No in S162) or when the direction of the estimated motion vector is downward (No in S163), the moving destination in the motion compensation could be within the first overlap region 316A. Accordingly, the first coding unit 303A determines that the second locally decoded image 318A corresponding to the first overlap region 316A is necessary (S165).

In such a manner, the first coding unit 303A obtains the second locally decoded image 318A generated by the second coding unit 303B when the estimated motion vector indicates the direction toward the dividing boundary, whereas the first coding unit 303A does not obtain the second locally decoded image 318A generated by the second coding unit 303B when the estimated motion vector does not indicate the direction toward the dividing boundary.

With the above processing, the image coding device 300 according to Embodiment 1 of the present invention enlarges the first overlap region 316A and the second overlap region 316B when the pixel rate of the input image signal 310 is low, and diminishes the first overlap region 316A and the second overlap region 316B when the pixel rate of the input image signal 310 is high.

As a result, the image coding device 300 can reduce the amount of data in the second locally decoded images 318A and 318B transferred between the first coding unit 303A and the second coding unit 303B when the pixel rate is high. This reduces the communication bandwidth between the first coding unit 303A and the second coding unit 303B. Further, it is possible to reduce the storage capacities of the locally decoded image storing units 712 storing the second locally decoded images 318A and 318B obtained. Furthermore, the reduction in the bandwidth between the first coding unit 303A and the second coding unit 303B allows the image coding device 300 to process the input image signal 310 of a higher pixel rate Here, when the pixel rate is high; that is, for example, when the frame rate is higher than 30 or 60 frames per second (300 frames per second, for example), the time interval between pictures is small, making the motion of the object captured or the motion of the imaging unit smaller. This leads to a presumption that the motion vector of the input image signal 310 is also smaller. Therefore, even when the search range of the motion compensation (the first overlap region 316A and the second overlap region 316B) is diminished, the coding efficiency and the image quality are not likely to deteriorate. As shown above, the image coding device 300 according to Embodiment 1 of the present invention can handle the input image signal 310 of a higher pixel rate, while suppressing the deterioration of the coding efficiency and the image quality.

In addition, the image coding device 300 can increase the coding efficiency and the image quality by widening the search range of the motion compensation in the case of a low pixel rate, which does not require a high processing speed compared to a high pixel rate.

Moreover, the image coding device 300 calculates a motion vector using an original image in the case of a high pixel rate.

This allows the image coding device 300 to transfer, from the locally decoded image storing unit 712 of one of the coding units, the second locally decoded image 318A or 318B corresponding to one of the first overlap region 316A and the second overlap region 316B, while the motion estimation unit 701 of the other one of the coding units calculates a motion vector using an original image as the search range. Therefore, the image coding device 300 can reduce the waiting time for which the motion estimation unit 701 waits for the second locally decoded image 318A or 318B of the other coding unit, thereby allowing a decrease in latency.

Further, through the motion vector estimation, the image coding device 300 determines whether or not the second locally decoded image 318A or 318B corresponding to one of the first overlap region 316A and the second overlap region 316B is necessary. As a result, the image coding device 300 can reduce the amount of data in the second locally decoded image 318A or 318B transferred, allowing reduction in the bandwidth between the first coding unit 303A and the second coding unit 303B.

Although the above description has shown that the pixel rate is determined according to a user's switching operation, the image size and the frame rate may instead be determined according to a user's switching operation, and the imaging method switching unit 301 may calculate the pixel rate using the determined image size and frame rate.

Moreover, it may also be that only one of the image size and the frame rate is determined according to a user's switching operation. In this case, it suffices to replace the pixel rate in the above description with the image size or the frame rate.

(Embodiment 2)

Embodiment 2 of the present invention describes a variation of the image coding device 300 according to Embodiment 1 described above. An image coding device 300A according to Embodiment 2 of the present invention determines the pixel rate of the input image signal 310 using information included in the input image signal 310, and changes the size of the first overlap region 316A and the second overlap region 316B according to the pixel rate determined.

First, the structure of the image coding device 300A according to Embodiment 2 of the present invention is described.

Figure 15:
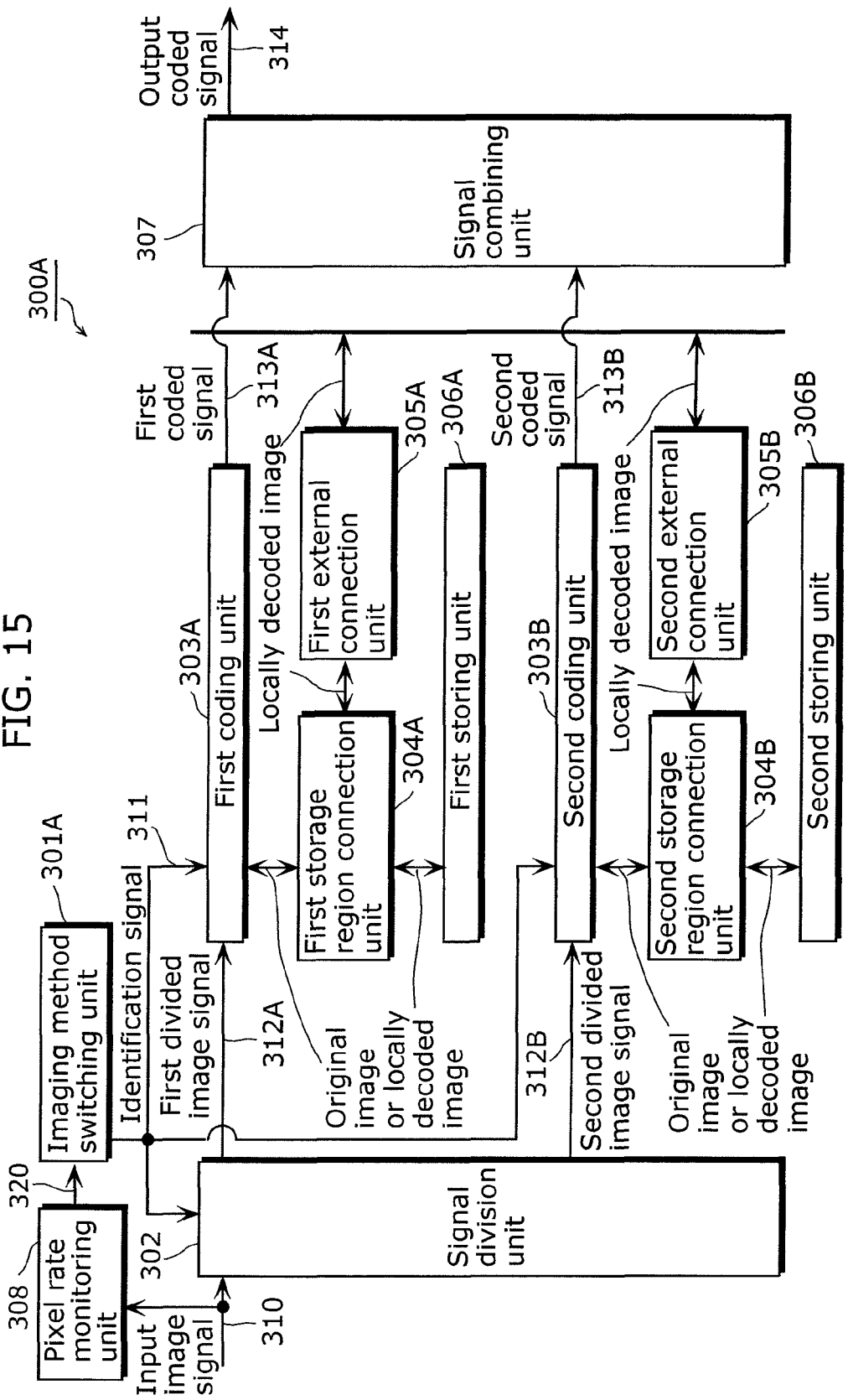
FIG. 15 is a block diagram of an image coding device according to Embodiment 2 of the present invention.

FIG. 15 is a block diagram showing the structure of the image coding device 300A according to Embodiment 2 of the present invention. The constituent elements common to those in FIG. 3 are given the same reference signs, and the descriptions thereof are omitted.

The image coding device 300A shown in FIG. 15 includes a pixel rate monitoring unit 308 added to the structure of the image coding device 300 shown in FIG. 3. A difference can also be found in the structure of an imaging method switching unit 301A.

The pixel rate monitoring unit 308 is equivalent to the first calculation unit of the present invention, and calculates the image size and the frame rate of the input image signal 310 using a pixel clock, a horizontal synchronization signal, and a vertical synchronization signal which are included in the input image signal 310 outputted by an imaging element. Further, the pixel rate monitoring unit 308 outputs, to the imaging method switching unit 301A, a monitoring result 320 including the image size and the frame rate calculated.

The imaging method switching unit 301A is equivalent to the second calculation unit of the present invention, and obtains the monitoring result 320 generated by the pixel rate monitoring unit 308 to determine one of pixel rates varying in i levels based on the monitoring result 320. To be more specific, the imaging method switching unit 301A calculates an estimated pixel rate by multiplying the image size by the frame rate which are included in the monitoring result 320. The higher the estimated pixel rate, the higher the pixel rate the imaging method switching unit 301A determines from among the pixel rates varying in i levels. For example, given that i is 2, the imaging method switching unit 301A sets a high-pixel-rate imaging method when the estimated pixel rate is equal to or higher than a predetermined value, and sets a low-pixel-rate imaging method when the estimated pixel rate is lower than the predetermined value. Further, the imaging method switching unit 301A outputs the identification signal 311 indicating the determined pixel rate to the signal division unit 302, the first coding unit 303A, and the second coding unit 303B.

It is to be noted that the imaging method switching unit 301A may determine one of the pixel rates varying in i levels using only one of the image size and the frame rate included in the monitoring result 320. More specifically, the imaging method switching unit 301A determines a higher pixel rate among the pixel rates varying in i levels when the image size included in the monitoring result 320 is larger. The imaging method switching unit 301A also determines a higher pixel rate among the pixel rates varying in i levels when the frame rate included in the monitoring result 320 is higher.

Next, operations of the image coding device 300A are described.

Figure 16:
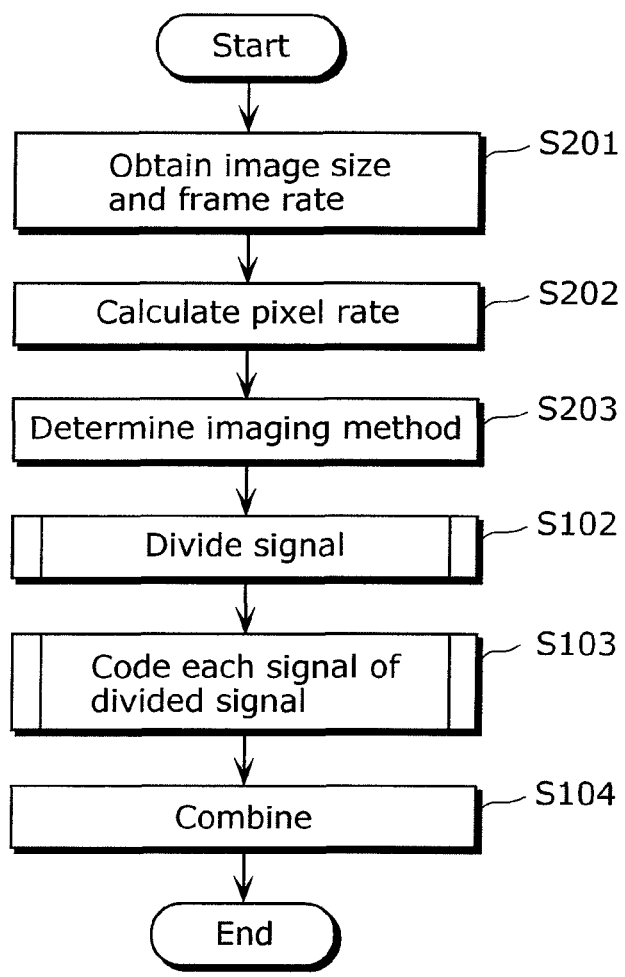
FIG. 16 is a flowchart of processing by an image coding device according to Embodiment 2 of the present invention.

FIG. 16 is a flowchart showing an operational flow of the image coding device 300A according to Embodiment 2 of the present invention. The processing common to those in FIG. 5 are given the same reference signs, and the descriptions thereof are omitted.

First, the pixel rate monitoring unit 308 obtains the image size and the frame rate of the input image signal 310 from information included in the input image signal 310 outputted by an imaging element (S201). Specifically, the pixel rate monitoring unit 308 calculates the image size and the frame rate, which are the monitoring result 320, by using the pixel clock, the horizontal synchronization signal, and the vertical synchronization signal included in the input image signal 310.

Next, the imaging method switching unit 301A obtains the monitoring result 320 generated by the pixel rate monitoring unit 308, and calculates a pixel rate corresponding to the image size and the frame rate included in the monitoring result 320 (S202). Next, the imaging method switching unit 301A determines an imaging method based on the pixel rate calculated (S203). In addition, the imaging method switching unit 301A outputs the identification signal 311 indicating the determined imaging method to the signal division unit 302, the first coding unit 303A, and the second coding unit 303B.

It is to be noted that Step S102 and the subsequent processing are the same as in Embodiment 1, and thus the descriptions thereof are omitted.

With the above processing, the image coding device 300A according to Embodiment 2 of the present invention can achieve the same advantageous effect as in Embodiment 1 described above.

In addition, since the pixel rate monitoring unit 308 directly monitors the input image signal 310 outputted by the imaging element, the image coding device 300A according to Embodiment 2 of the present invention can dynamically or adaptively identify the image size and the frame rate of the input image signal 310 outputted from the imaging element, without being dependent on a specific imaging element. Moreover, the image size and the frame rate of the imaging element are changed according to a command and the like outputted by a micro-controller and so on. Having the pixel rate monitoring unit 308 allows the image coding device 300A to adaptively handle such changes.

As described, the image coding device 300A according to Embodiment 2 of the present invention can achieve reduction in the bandwidth between the coding units and the coding processing at a higher pixel rate, without being dependent on the structure of the imaging element or the structure of the micro-controller.

(Embodiment 3)

Embodiment 3 of the present invention describes a variation of the image coding device 300 according to Embodiment 1 described above. An image coding device 300B according to Embodiment 3 of the present invention changes the size of the first overlap region 316A and the second overlap region 316B according to remaining buffer capacities of the first storing unit 306A and the second storing unit 306B.

First, the structure of the image coding device 300B according to Embodiment 3 of the present invention is described.

Figure 17:
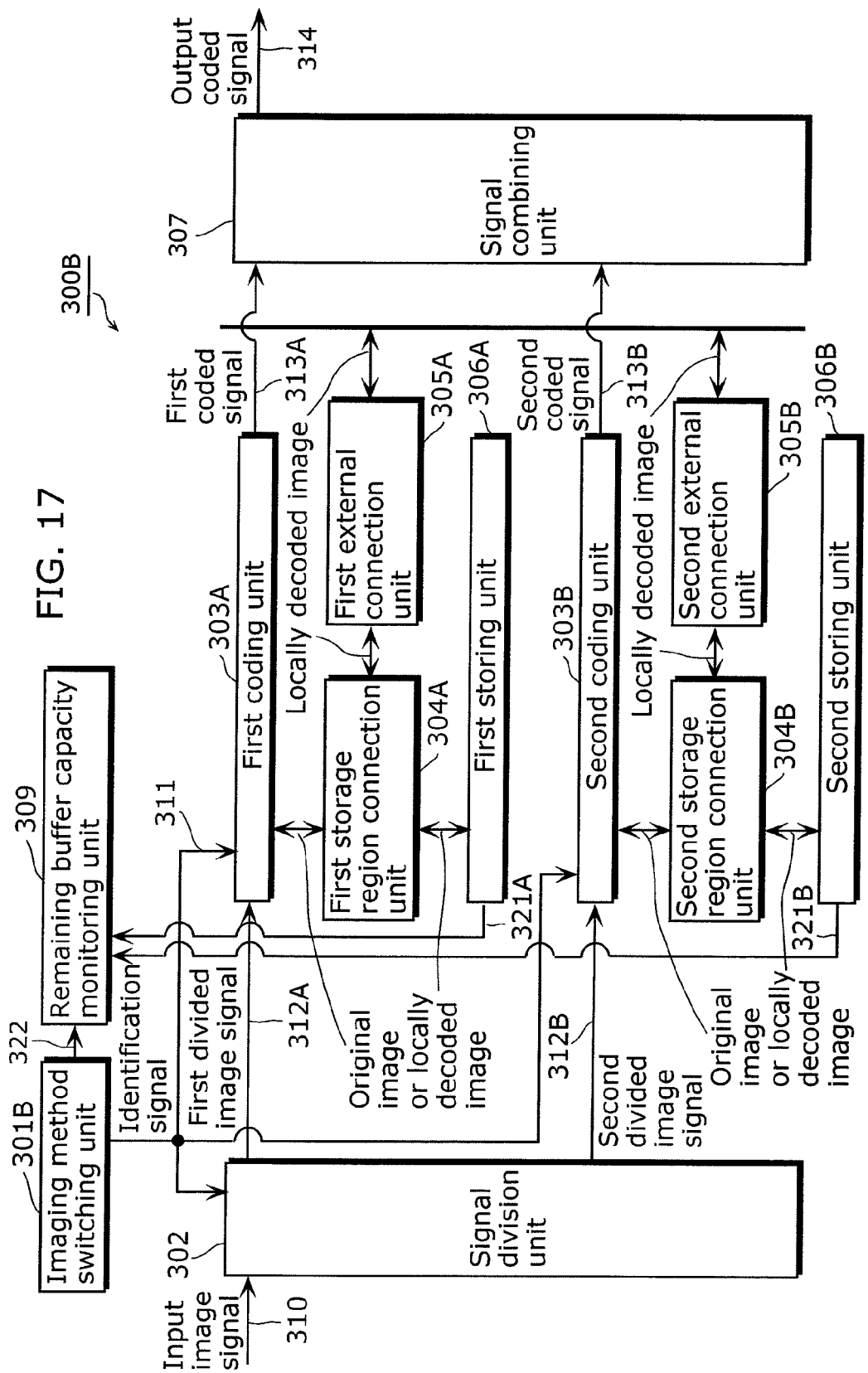
FIG. 17 is a block diagram of an image coding device according to Embodiment 3 of the present invention.

FIG. 17 is a block diagram showing the structure of the image coding device 300B according to Embodiment 3 of the present invention. The constituent elements common to those in FIG. 3 are given the same reference signs, and the descriptions thereof are omitted.

The image coding device 300A shown in FIG. 17 includes a remaining buffer capacity monitoring unit 309 added to the structure of the image coding device 300 shown in FIG. 3. A difference can also be found in the structure of an imaging method switching unit 301B.

The remaining buffer capacity monitoring unit 309 obtains, at predetermined time intervals, a remaining buffer capacity 321A which indicates an available region within the storage region of the first storing unit 306A used by the first coding unit 303A as a frame buffer or a line buffer. The remaining buffer capacity monitoring unit 309 also obtains a remaining buffer capacity 321B of the second storing unit 306B used by the second coding unit 303B as a frame buffer or a line buffer. Further, the remaining buffer capacity monitoring unit 309 generates a remaining buffer capacity signal 322 indicating a smaller one of the remaining buffer capacities 321A and 321B, and outputs the remaining buffer capacity signal 322 to the imaging method switching unit 301B.

The imaging method switching unit 301B obtains the remaining buffer capacity signal 322 outputted by the remaining buffer capacity monitoring unit 309. The imaging method switching unit 301B determines one of the pixel rates varying in i levels according to the remaining buffer capacity signal 322 obtained.

Here, in the case of coding at a high pixel rate, the available resources of the first coding unit 303A and the second coding unit 303B decrease and the processing statuses of the first coding unit 303A and the second coding unit 303B become busy, which generally leads to a decrease in the remaining buffer capacities 321A and 321B compared to the case of coding at a low pixel rate.

Thus, the imaging method switching unit 301B can determine the pixel rate using the remaining buffer capacities 321A and 321B.

More specifically, the greater the remaining buffer capacity signal 322, the higher the pixel rate the imaging method switching unit 301B determines. For example, given that i is 2, the imaging method switching unit 301B sets the high-pixel-rate imaging method when the remaining buffer capacity signal 322 indicates a capacity greater than a predetermined value, and sets the low-pixel-rate imaging method when the remaining buffer capacity signal 322 indicates a capacity equal to or smaller than the predetermined value. Further, the imaging method switching unit 301B outputs the identification signal 311 indicating the determined pixel rate to the signal division unit 302, the first coding unit 303A, and the second coding unit 303B.

It is to be noted that instead of estimating the pixel rate based on the remaining buffer capacity signal 322, the imaging method switching unit 301B may output the identification signal 311 indicating whether or not the remaining buffer capacity signal 322 indicates a capacity greater than a predetermined value.

The identification signal 311 is also used for determining the width n of the first overlap region 316A, the second overlap region 316B, and the second locally decoded images 318A and 318B. Specifically, the signal division unit 302 uses the identification signal 311 to determine the width n of the first overlap region 316A and the second overlap region 316B. The first coding unit 303A and the second coding unit 303B also use the identification signal 311 to determine a motion search range.

Next, operations of the image coding device 300B are described.

Figure 18:
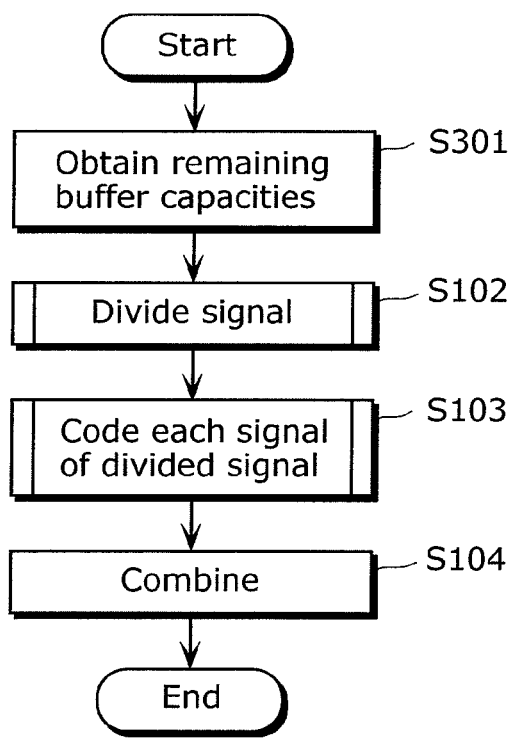
FIG. 18 is a flowchart of processing by an image coding device according to Embodiment 3 of the present invention.

FIG. 18 is a flowchart showing an operational flow of the image coding device 300B according to Embodiment 3 of the present invention. The processing common to those in FIG. 5 are given the same reference signs, and the descriptions thereof are omitted.

First, the remaining buffer capacity monitoring unit 309 obtains the remaining buffer capacity 321A of the first storing unit 306A used by the first coding unit 303A as a frame buffer or a line buffer, and the remaining buffer capacity 321B of the second storing unit 306B used by the second coding unit 303B as a frame buffer or a line buffer (S301). Further, the remaining buffer capacity monitoring unit 309 generates the remaining buffer capacity signal 322 indicating a smaller one of the remaining buffer capacities 321A and 321B.

Next, the imaging method switching unit 301B obtains the remaining buffer capacity signal 322 outputted by the remaining buffer capacity monitoring unit 309. Next, the imaging method switching unit 301B determines a pixel rate according to the remaining buffer capacity signal 322 obtained. Further, the imaging method switching unit 301B outputs the identification signal 311 indicating the determined pixel rate to the signal division unit 302, the first coding unit 303A, and the second coding unit 303B.

It is to be noted that Step S102 and the subsequent processing are the same as in Embodiment 1, and thus the descriptions thereof are omitted.

Next, detailed operations involved in the signal division (S102) are described.

Figure 19:
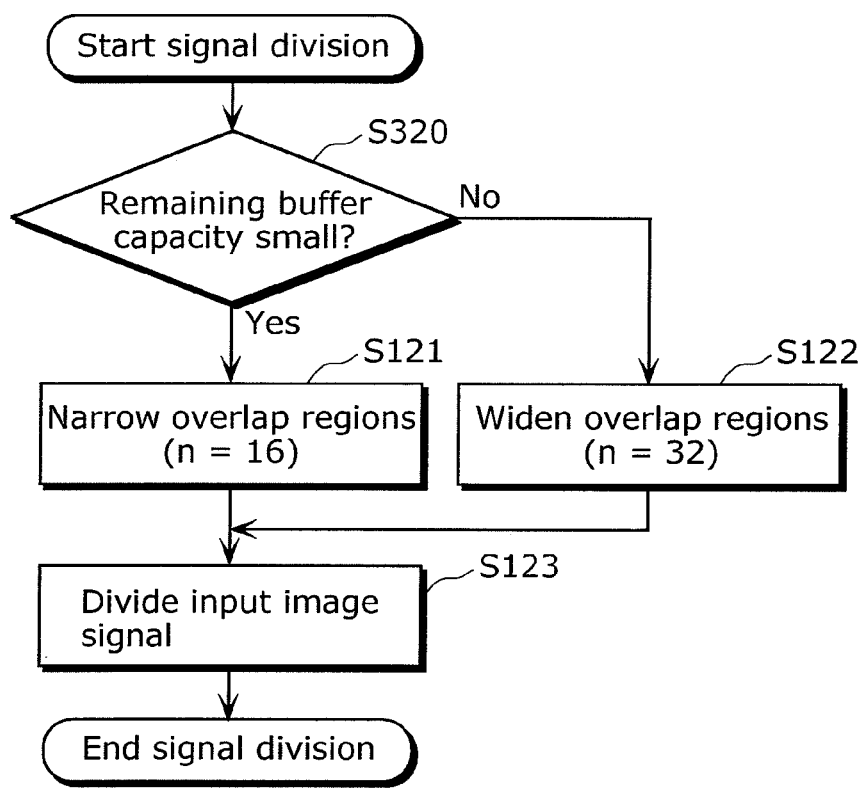
FIG. 19 is a flowchart of image division by an image coding device according to Embodiment 3 of the present invention.

FIG. 19 is a flowchart showing a processing flow of the signal division by the signal division unit 302.

As shown in FIG. 19, first, the signal division unit 302 refers to the identification signal 311 to determine whether or not the remaining buffer capacity signal 322 (pixel rate) indicates a capacity so equal to or smaller than a predetermined value (S320).

When the remaining buffer capacity signal 322 indicates a capacity equal to or smaller than the predetermined value (Yes in S320), the signal division unit 302 narrows the first overlap region 316A and the second overlap region 316B (S121).

Next, the signal division unit 302 divides the input image signal 310 to generate the first divided image signal 312A including the first overlap region 316A, the size of which has been determined in Step S121, and the second divided image signal 312B including the second overlap region 316B, the size of which has been determined in Step S121 (S123).

On the other hand, when the remaining buffer capacity signal 322 indicates a capacity greater than the predetermined value (No in S320), the signal division unit 302 widens the first overlap region 316A and the second overlap region 316B (S122).

Next, the signal division unit 302 divides the input image signal 310 to generate the first divided image signal 312A including the first overlap region 316A, the size of which has been determined in Step S122, and the second divided image signal 312B including the second overlap region 316B, the size of which has been determined in Step S122 (S123).

With the above processing, the image coding device 300B according to Embodiment 3 of the present invention monitors the remaining buffer capacity 321A of the first storing unit 306A used by the first coding unit 303A as a frame buffer or a line buffer, and the remaining buffer capacity 321B of the second storing unit 306B used by the second coding unit 303B as a frame buffer or a line buffer. In addition, the image coding device 300B uses the remaining buffer capacities 321A and 321B to determine the availability of the resources of the first coding unit 303A and the second coding unit 303B and the status of the coding processing of the first coding unit 303A and the second coding unit 303B, and generates the identification signal 311 according to the determination result.

In this manner, the image coding device 300B according to Embodiment 3 of the present invention can achieve the same advantageous effect as in Embodiment 1 described above.

Moreover, the image coding device 300B according to Embodiment 3 of the present invention can reduce the number of lines n of the first overlap region 316A and the second overlap region 316B when the remaining buffer capacities 321A and 321B are small. This allows reduction in the processing amounts of the first coding unit 303A and the second coding unit 303B when the available resources of the first coding unit 303A and the second coding unit 303B decrease and the processing statuses of the first coding unit 303A and the second coding unit 303B are busy, regardless of the level of the pixel rate.

As described, the image coding device 300B according to Embodiment 3 of the present invention can achieve reduction in the bandwidth between the coding units and the coding processing at a higher pixel rate, while reducing the storage regions according to the resource availability of the line buffers or the frame buffers of the first coding unit 303A and the second coding unit 303B.

(Embodiment 4)

Embodiment 4 of the present invention describes a variation of the image coding device 300 according to Embodiment 1 described above. An image coding device 300C according to Embodiment 4 of the present invention changes the size of the first overlap region 316A and the second overlap region 316B according to a motion vector.

First, the structure of the image coding device 300C according to Embodiment 4 of the present invention is described.

Figure 20:
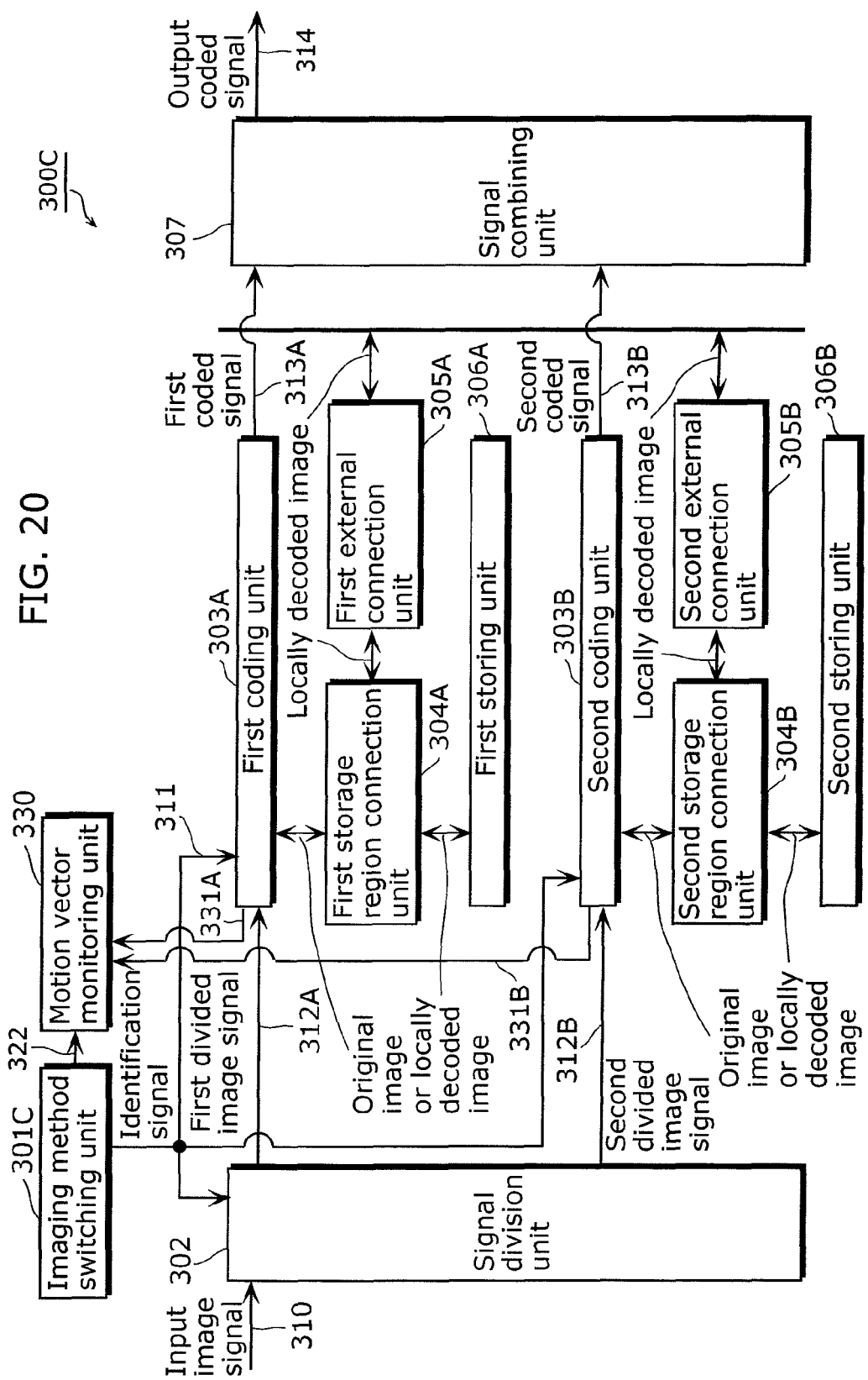
FIG. 20 is a block diagram of an image coding device according to Embodiment 4 of the present invention.

FIG. 20 is a block diagram showing the structure of the image coding device 300C according to Embodiment 4 of the present invention. The constituent elements common to those in FIG. 3 are given the same reference signs, and the descriptions thereof are omitted.

The image coding device 300C shown in FIG. 20 includes a motion vector monitoring unit 330 added to the structure of the image coding device 300 shown in FIG. 3. A difference can also be found in the structure of an imaging method switching unit 301C.

The motion vector monitoring unit 330 obtains a motion vector 331A generated by the first coding unit 303A and a motion vector 331B generated by the second coding unit 303B. Then, the motion vector monitoring unit 330 outputs a motion vector 332 which is the greatest one of the motion vectors 331A and 331B to the imaging method switching unit 301C. To be more specific, the motion vector monitoring unit 330 outputs, to the imaging method switching unit 301C, the motion vector 332 which, for example, extends across the dividing boundary (the boundary between the first coding target region 315A and the second coding target region 315B) and is the greatest one of plural motion vectors included in the motion vectors 331A and 331B.

For example, the motion vectors 331A and 331B are plural motion vectors 725 of one picture which have been estimated by the motion estimation unit 701. In other words, the motion vector monitoring unit 330 selects a greatest motion vector 332 for each picture included in the input image signal 310.

The imaging method switching unit 301C obtains the motion vector 332 outputted by the motion vector monitoring unit 330. Further, the imaging method switching unit 301C determines one of the pixel rates varying in i levels according to the motion vector 332 obtained.

Here, the motion of the object captured or the motion of the imaging unit is smaller when, for example, an image signal captured at high speed is coded, that is, when an image signal of a high pixel rate is coded. Thus, the imaging method switching unit 301C can determine the pixel rate using the motion vector 332.

More specifically, the greater the motion vector 332, the lower the pixel rate the imaging method switching unit 301C determines. For example, given that i is 2, the imaging method switching unit 301C sets the low-pixel-rate imaging method when the motion vector 332 is greater than a predetermined value, and sets the high-pixel-rate imaging method when the motion vector 332 is equal to or smaller than the predetermined value. Further, the imaging method switching unit 301C outputs the identification signal 311 indicating the determined pixel rate to the signal division unit 302, the first coding unit 303A, and the second coding unit 303B.

Next, operations of the image coding device 300C are described.

Figure 21:
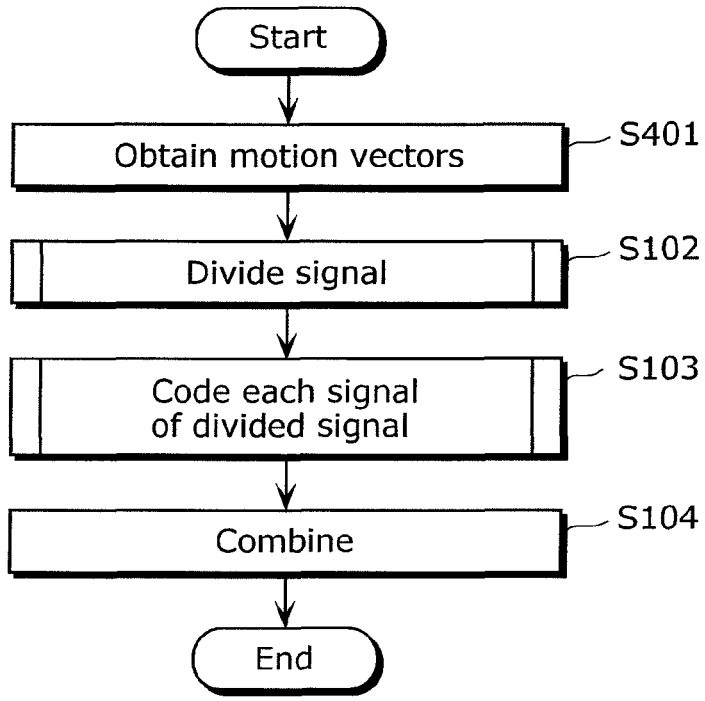
FIG. 21 is a flowchart of processing by an image coding device according to Embodiment 4 of the present invention.

FIG. 21 is a flowchart showing an operational flow of the image coding device 300C according to Embodiment 4 of the present invention. The processing common to those in FIG. 6 are given the same reference signs, and the descriptions thereof are omitted.

As shown in FIG. 21, first, the motion vector monitoring unit 330 obtains the motion vector 331A generated by the first coding unit 303A and the motion vector 331B generated by the second coding unit 303B (S401). Then, the motion vector monitoring unit 330 outputs, to the imaging method switching unit 301C, the motion vector 332 which extends across the dividing boundary and is the greatest one of the plural motion vectors included in the motion vectors 331A and 331B obtained.

Next, the imaging method switching unit 301C obtains the motion vector 332 outputted by the motion vector monitoring unit 330. Then, the imaging method switching unit 301C determines a pixel rate according to the obtained motion vector 332. Further, the imaging method switching unit 301C outputs the identification signal 311 indicating the determined pixel rate to the signal division unit 302, the first coding unit 303A, and the second coding unit 303B.

It is to be noted that Step S102 and the subsequent processing are the same as in Embodiment 1, and thus the descriptions thereof are omitted.

Next, detailed operations involved in the signal division (S102) are described.

Figure 22:
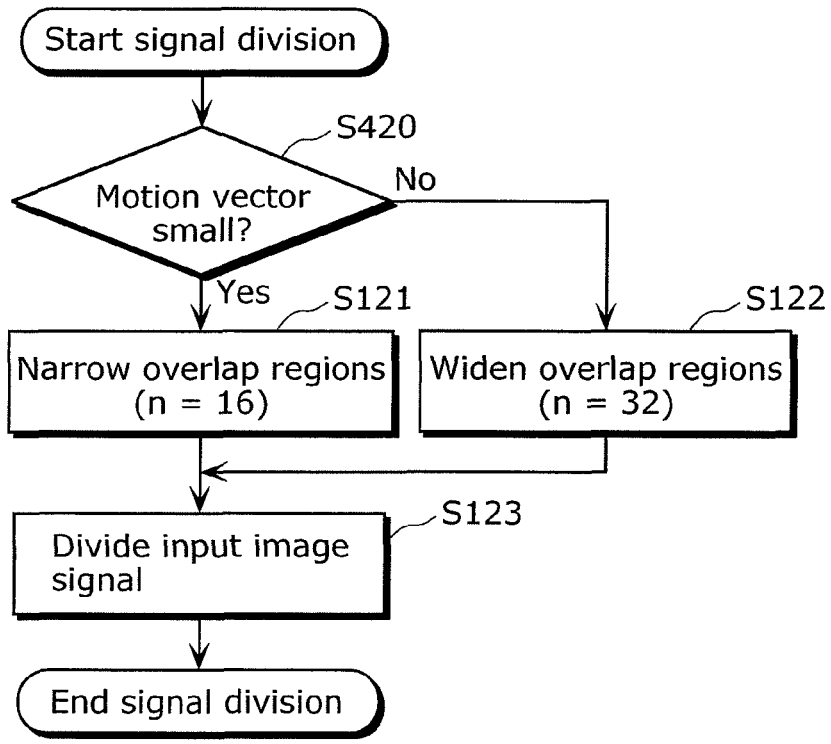
FIG. 22 is a flowchart of image division by an image coding device according to Embodiment 4 of the present invention.

FIG. 22 is a flowchart showing a processing flow of the signal division by the signal division unit 302.

As shown in FIG. 22, first, the signal division unit 302 refers to the identification signal 311 to determine whether or not the motion vector 332 (pixel rate) is equal to or smaller than a predetermined value (S420).

When the motion vector 332 is equal to or smaller than the predetermined value (Yes in S420), the signal division unit 302 narrows the first overlap region 316A and the second overlap region 316B (S121).

Next, the signal division unit 302 divides the input image signal 310 to generate the first divided image signal 312A including the first overlap region 316A, the size of which has been determined in Step S121, and the second divided image signal 312B including the second overlap region 316B, the size of which has been determined in Step S121 (S123).

On the other hand, when the motion vector 332 is greater than the predetermined value (No in S420), the signal division unit 302 widens the first overlap region 316A and the second overlap region 316B (S122).

Next, the signal division unit 302 divides the input image signal 310 to generate the first divided image signal 312A including the first overlap region 316A, the size of which has been determined in Step S122, and the second divided image signal 312B including the second overlap region 316B, the size of which has been determined in Step S122 (S123).

With above processing, the image coding device 300C according to Embodiment 4 of the present invention monitors the greatest value among the motion vectors 331A and 331B. Further, the image coding device 300C determines the status of the prediction signal of the coding processing according to the greatest value among the motion vectors 331A and 331B, and generates the identification signal 311 based on the determination result.

In this manner, the image coding device 300C according to Embodiment 4 of the present invention can achieve the same advantageous effect as in Embodiment 1 described above.

In addition, the image coding device 300C according to Embodiment 4 of the present invention reduces the number of lines n of the first overlap region 316A and the second overlap region 316B when the motion vector is small. With a small motion vector, the coding efficiency and the image quality are not likely to deteriorate even when the search range of the motion compensation (the first overlap region 316A and the second overlap region 316B) is diminished. As shown above, the image coding device 300C according to Embodiment 4 of the present invention can perform the coding processing at a higher pixel rate, while suppressing the deterioration of the coding efficiency and the image quality.

In addition, the image coding device 300C according to Embodiment 4 of the present invention narrows the first overlap region 316A and the second overlap region 316B when the motion vector is small, regardless of the level of the pixel rate. This leads to further reduction in the amount of data transferred between the first coding unit 303A and the second coding unit 303B.

As described, the image coding device 300C according to Embodiment 4 of the present invention can achieve reduction in the bandwidth between the coding units and the coding processing at a higher pixel rate, by changing the size of the first overlap region 316A and the second overlap region 316B according to the motion vectors 331A and 331B generated by the first coding unit 303A and the second coding unit 303B.

The image coding device 300C changes the size of the first overlap region 316A and the second overlap region 316B according to the motion vector 332 which is the greatest motion vector and extends across the dividing boundary (the boundary between the first coding target region 315A and the second coding target region 315B). This enables more appropriate determination of the size of the first overlap region 316A and the second overlap region 316B.

Specifically, a small motion is expected near the dividing boundary even when the motion of the whole picture is large. In such a case, the coding efficiency and the image quality are not likely to deteriorate even when the size of the first overlap region 316A and the second overlap region 316B is small, because the motion is small near the dividing boundary. In such a case, the image coding device 300C can diminish the size of the first overlap region 316A and the second overlap region 316B. As a result, the image coding device 300C can reduce the amount of data transferred between the first coding unit 303A and the second coding unit 303B, while suppressing deterioration of the coding efficiency and the image quality.

The image coding devices 300 to 300C according to Embodiments 1 to 4 of the present invention have been described above, but the present invention is not limited to these embodiments.

For example, although Embodiments 1 to 4 have illustrated the example in which the image coding devices 300 to 300C change the size of the first overlap region 316A and the second overlap region 316B in two levels, the size may be changed in three levels or more. In this case, it is sufficient for the image coding devices 300 to 300C to make the size of the first overlap region 316A and the second overlap region 316B smaller when the pixel rate is higher.

Further, although Embodiments 1 to 4 have illustrated the example in which the image coding devices 300 to 300C horizontally divide the input image signal 310 into two, the input image signal 310 may be vertically divided into two. Furthermore, the image coding devices 300 to 300C may divide the input image signal 310 into three or more images and include three or more coding units which code the three or more images, respectively. Moreover, the sizes of the images of the divided signal may be different from one another. In addition, the size of the first overlap region 316A may be different from that of the second overlap region 316B.

Also, Embodiments 1 to 4 have illustrated that the image coding devices 300 to 300C change the size of the first overlap region 316A and the second overlap region 316B according to one of the four items, namely, a user's switching operation, information included in the input image signal 310, the remaining buffer capacity signal 322, and the motion vector 332. However, the size of the first overlap region 316A and the second overlap region 316B may be changed according to two or more items among the four.

For example, in the case of changing the size of the first overlap region 316A and the second overlap region 316B according to the remaining buffer capacity signal 322 and the motion vector 332, the image coding devices 300 to 300C widen the first overlap region 316A and the second overlap region 316B when the remaining buffer capacity signal 322 indicates a capacity greater than a predetermined value and the motion vector 332 is greater than a predetermined value. On the other hand, the image coding devices 300 to 300C narrow the first overlap region 316A and the second overlap region 316B when at least one of the following cases applies: (1) the remaining buffer capacity signal 322 indicates a capacity equal to or smaller than the predetermined value, and (2) the motion vector 332 is equal to or smaller than the predetermined value. The image coding devices may also change the size of the first overlap region 316A and the second overlap region 316B in three levels or more according to each of combinations of a great or small capacity indicated by the remaining buffer capacity signal 322 and a great or small motion vector 332.

Moreover, Embodiment 1 has illustrated the case where the standard of the pixel rate used for determining the size of the first overlap region 316A and the second overlap region 316B is the same as the standard of the pixel rate used for determining whether to use an original image or a locally decoded image for the motion estimation. However, different standards may be used for the pixel rate. To put it differently, the image coding device 300 may determine the size of the first overlap region 316A and the second overlap region 316B depending on whether or not the pixel rate is higher than a first threshold, and determine whether to use an original image or a locally decoded image for the motion estimation depending on whether or not the pixel rate is higher than a second threshold different from the first threshold.

Each processing unit of the image coding devices 300 to 300C according to Embodiments 1 to 4 is typically realized in the form of an LSI which is an integrated circuit. The processing units may be realized in a single chip individually, or in a single chip that includes some or all of them.

Typically, all the processing units shown in FIG. 3 except for the first storing unit 306A and the second storing unit 306B are realized as a single-chip LSI.

Moreover, ways to achieve an integration circuit are not limited to the LSI, and a special circuit or a general purpose processor and so forth can also be used. It is also possible to use a Field Programmable Gate Array (FPGA) that can be programmed after LSI manufacturing, or use a reconfigurable processor which can reconfigure the connection and setting of a circuit cell inside the LSI.

Further, some or all of the functions of the image coding devices 300 to 300C according to Embodiments 1 to 4 of the present invention may be implemented through execution of a program by a processor such as a CPU.

Furthermore, the present invention may be the above program or a recording medium on which the above program is recorded. It is apparent that the program can be distributed via a transmission medium such as the Internet.

It is also possible to combine at least some of the functions of the image coding devices 300 to 300C according to Embodiments 1 to 4 and variations thereof.

INDUSTRIAL APPLICABILITY

The present invention is applicable to coding devices. Further, the present invention is useful for digital still cameras and digital video cameras which perform high-speed imaging or high-precision-image capturing, for which coding processing at a high pixel rate is required.

REFERENCE SIGNS LIST 100, 300, 300A, 300B, 300C Image coding device
101 Image signal input terminal
102, 302 Signal division unit
103A, 303A First coding unit
103B, 303B Second coding unit
106, 307 Signal combining unit
107 Coded signal output terminal
108 Coding unit
110, 310 Input image signal
111A, 312A First divided image signal
111B, 312B Second divided image signal
112A, 313A First coded signal
112B, 313B Second coded signal
113A, 113B Locally decoded image
114, 314 Output coded signal
115A, 316A First overlap region
115B, 316B Second overlap region
116A First search range
116B Second search range
301, 301A, 301B, 301C Imaging method switching unit
304A First storage region connection unit
304B Second storage region connection unit
305A First external connection unit
305B Second external connection unit
306A First storing unit
306B Second storing unit
307 Pixel rate monitoring unit
309 Remaining buffer capacity monitoring unit
311 identification signal
315A First coding target region
315B Second coding target region
317A, 317B First locally decoded image
318A, 318B Second locally decoded image
320 Monitoring result
321A, 321B Remaining buffer capacity
322 Remaining buffer capacity signal
330 Motion vector monitoring unit
331A, 331B, 332 Motion vector
701 Motion estimation unit
702 Original image storing unit
703 Subtraction unit
704, 711, 713 Switch
705 Transform unit
706 Quantization unit
707 Variable-length coding unit
708 Inverse quantization unit
709 Inverse transform unit
710 Addition unit
712 Locally decoded image storing unit
714 Motion compensation unit
721 Prediction error signal
722, 724 DCT coefficients
723 Quantized coefficients
725 Motion vector
726 Predicted image
727 Locally decoded signal
901 Coding block
902, 904, 906, 908 Motion vector
903, 905, 907 Adjacent block

The invention claimed is:

1. An image coding device which codes an input image signal to generate an output coded signal, said image coding device comprising:

a signal division unit configured to divide each of pictures included in the input image signal into plural images to be coded;

plural coding units each of which corresponds to one of the plural images to be coded and is configured to code the corresponding one of the plural images to be coded to generate a coded signal, and to code and decode the corresponding one of the plural images to be coded to generate a locally decoded image, the coding including motion compensation; and a signal combining unit configured to combine plural coded signals generated by said plural coding units to generate the output coded signal, wherein said signal division unit is configured to determine, as a search range to be used for the motion compensation by each of said plural coding units, a range including (i) one of the plural images to be coded corresponding to said coding unit and (ii) an overlap region which is adjacent to the one of the plural images to be coded and is included in another one of the plural images to be coded that is adjacent to the one of the plural images to be coded, each of said plural coding units is configured to perform the motion compensation using a first locally decoded image of the corresponding one of the plural images to be coded and a second locally decoded image of the overlap region, the first locally decoded image being generated by said coding unit, the second locally decoded image being generated by another one of said plural coding units, and the corresponding one of the plural images to be coded and the overlap region being included in the search range, and said signal division unit is configured to change a size of the overlap region according to a predetermined condition.

2. The image coding device according to claim 1, wherein said signal division unit is configured to determine, as the size of the overlap region, a first size when a pixel rate is lower than a first threshold, and a second size, which is smaller than the first size, when the pixel rate is higher than the first threshold, the pixel rate being the number of pixels to be processed by said image coding device per unit of time.

3. The image coding device according to claim 2, wherein each of said plural coding units includes:
   a motion estimation unit configured to estimate a motion vector for each of plural blocks included in the corresponding one of the plural images to be coded; and
   a motion compensation unit configured to perform the motion compensation using the motion vector estimated by said motion estimation unit, and
said image coding device further comprises
plural original image storing units each of which corresponds to one of said plural coding units and is configured to store, as an original image, the corresponding one of the plural images to be coded and an image of the overlap region corresponding to the corresponding one of the plural images to be coded,
wherein said motion estimation unit is configured to estimate the motion vector using the original image stored in a corresponding one of said plural original image storing units.

4. The image coding device according to claim 3, further comprising
plural locally decoded image storing units each of which corresponds to one of said plural coding units and is configured to store the first locally decoded image and the second locally decoded image which are to be used by the corresponding one of said plural coding units for the motion compensation,
wherein said motion estimation unit is configured to estimate the motion vector using the original image stored in the corresponding one of said plural original image storing units when the pixel rate is higher than a second threshold, and estimate the motion vector using the first locally decoded image and the second locally decoded image stored in a corresponding one of said plural locally decoded image storing units when the pixel rate is lower than the second threshold.

5. The image coding device according to claim 4, wherein each of said plural coding units is configured to request the second locally decoded image from another one of said plural coding units, and
when the pixel rate is higher than the second threshold, said motion estimation unit is configured to start estimating the motion vector using the original image stored in the corresponding one of said plural original image storing units before said coding unit which has requested the second locally decoded image obtains the second locally decoded image from the another one of said plural coding units as a result of the request.

6. The image coding device according to claim 2, further comprising
a pixel rate obtaining unit configured to obtain the pixel rate specified by a user operation.

7. The image coding device according to claim 2, further comprising:
   a first calculation unit configured to calculate at least one of an image size of the input image signal and a frame rate of the input image signal, using information included in the input image signal; and
   a second calculation unit configured to calculate the pixel rate using at least one of the image size and the frame rate calculated by said first calculation unit.

8. The image coding device according to claim 7, wherein said first calculation unit is configured to calculate at least one of the image size of the input image signal and the frame rate of the input image signal, using at least one of a pixel clock, a horizontal synchronization signal, and a vertical synchronization signal which are included in the input image signal.

9. The image coding device according to claim 1, further comprising
   a first storing unit configured to store the first locally decoded images each of which is generated by a corresponding one of said plural coding units,
wherein said signal division unit is configured to determine, as the size of the overlap region, a first size when an available capacity of said first storing unit is greater than a first threshold, and a second size, which is smaller than the first size, when the available capacity is smaller than the first threshold.

10. The image coding device according to claim 9, wherein said first storing unit includes plural second storing units each of which corresponds to one of said plural coding units and is configured to store a corresponding one of the first locally decoded images and a corresponding one of the second locally decoded images, the corresponding one of the first locally decoded images and the corresponding one of the second locally decoded images being used by the corresponding one of said plural coding units for the motion compensation, and
said signal division unit is configured to determine, as the size of the overlap region, the first size when a smallest one of available capacities of said plural second storing units is greater than the first threshold, and the second size when the smallest one of the available capacities is smaller than the first threshold.

11. The image coding device according to claim 1, wherein each of said plural coding units includes:
   a motion estimation unit configured to estimate a motion vector for each of plural blocks included in the corresponding one of the plural images to be coded; and
   a motion compensation unit configured to perform the motion compensation using the motion vector estimated by said motion estimation unit, and
said signal division unit is configured to determine, as the size of the overlap region, a first size when the motion vector is greater than a first threshold, and a second size, which is smaller than the first size, when the motion vector is smaller than the first threshold.

12. The image coding device according to claim 11, wherein said signal division unit is configured to determine, as the size of the overlap region, the first size when a greatest motion vector is greater than the first threshold, and the second size when the greatest motion vector is smaller than the first threshold, the greatest motion vector being included in motion vectors extending across a boundary of the plural images to be coded, the motion vectors extending across the boundary being included in motion vectors estimated by said motion estimation unit.

13. The image coding device according to claim 2, wherein each of said plural coding units includes:
- a motion estimation unit configured to estimate a motion vector for each of plural blocks included in the corresponding one of the plural images to be coded; and
- a motion compensation unit configured to perform the motion compensation using the motion vector estimated by said motion estimation unit, and each of said plural coding units is configured to calculate a motion vector of a block adjacent to a boundary between the corresponding one of the plural images to be coded and the overlap region corresponding to the corresponding one of the plural images to be coded, using a motion vector of a neighboring block of the block, and (i) to obtain the second locally decoded image generated by the another one of said plural coding units when the calculated motion vector indicates a direction toward the boundary, and (ii) not to obtain the second locally decoded image generated by the another one of said plural coding units when the calculated motion vector does not indicate the direction toward the boundary.

14. An image coding method for coding an input image signal to generate an output coded signal, said image coding method comprising:
- dividing each of pictures included in the input image signal into plural images to be coded;
- coding, performed by plural coding units each of which corresponds to one of the plural images to be coded, the corresponding one of the plural images to be coded to generate a coded signal, and coding and decoding, performed by the plural coding units, the corresponding one of the plural images to be coded to generate a locally decoded image, said coding including motion compensation; and
- combining plural coded signals generated in said coding to generate the output coded signal, wherein said dividing includes determining, as a search range to be used for the motion compensation by each of the plural coding units, a range including (i) one of the plural images to be coded corresponding to the coding unit and (ii) an overlap region which is adjacent to the one of the plural images to be coded and is included in another one of the plural images to be coded that is adjacent to the one of the plural images to be coded, said coding includes performing, by each of the plural coding units, the motion compensation using a first locally decoded image of the corresponding one of the plural images to be coded and a second locally decoded image of the overlap region, the first locally decoded image being generated by the coding unit, the second locally decoded image being generated by another one of the plural coding units, and the corresponding one of the plural images to be coded and the overlap region being included in the search range, and said dividing includes changing a size of the overlap region according to a predetermined condition.

15. A non-transitory computer-readable medium having a program stored thereon for causing a computer to execute the image coding method according to claim 14.

16. An integrated circuit which codes an input image signal to generate an output coded signal, said integrated circuit comprising:
- a signal division unit configured to divide each of pictures included in the input image signal into plural images to be coded;
- plural coding units each of which corresponds to one of the plural images to be coded and is configured to code the corresponding one of the plural images to be coded to generate a coded signal, and to code and decode the corresponding one of the plural images to be coded to generate a locally decoded image, the coding including motion compensation; and
- a signal combining unit configured to combine plural coded signals generated by said plural coding units to generate the output coded signal, wherein said signal division unit is configured to determine, as a search range to be used for the motion compensation by each of said plural coding units, a range including (i) one of the plural images to be coded corresponding to said coding unit and (ii) an overlap region which is adjacent to the one of the plural images to be coded and is included in another one of the plural images to be coded that is adjacent to the one of the plural images to be coded, each of said plural coding units is configured to perform the motion compensation using a first locally decoded image of the corresponding one of the plural images to be coded and a second locally decoded image of the overlap region, the first locally decoded image being generated by said coding unit, the second locally decoded image being generated by another one of said plural coding units, and the corresponding one of the plural images to be coded and the overlap region being included in the search range, and said signal division unit is configured to change a size of the overlap region according to a predetermined condition.

* * * * *